US006960886B2

(12) United States Patent
Ishizuka

(10) Patent No.: US 6,960,886 B2
(45) Date of Patent: Nov. 1, 2005

(54) HIGH-PRESSURE METAL-VAPOR DISCHARGE LAMP LIGHTING APPARATUS AND HEADLIGHT DEVICE FOR AUTOMOBILE

(75) Inventor: Akio Ishizuka, Yokohama (JP)

(73) Assignee: Harison Toshiba Lighting Corp., Ehime-ken (JP)

( * ) Notice: Subject to any disclaimer, the term of this patent is extended or adjusted under 35 U.S.C. 154(b) by 31 days.

(21) Appl. No.: 10/788,144

(22) Filed: Feb. 25, 2004

(65) Prior Publication Data

US 2004/0183476 A1 Sep. 23, 2004

(30) Foreign Application Priority Data

Feb. 25, 2003 (JP) ....................................... 2003-047235

(51) Int. Cl.[7] .......................... H05B 37/02; H05B 41/16
(52) U.S. Cl. ......................................... 315/80; 315/224
(58) Field of Search ............................ 315/80, 82, 156, 315/157, 158, 224, 291, 307, 308, 309, 310, DIG. 7

(56) References Cited

U.S. PATENT DOCUMENTS

| | | | | |
|---|---|---|---|---|
| 6,215,252 B1 | 4/2001 | Stanton | 315/224 |
| 6,353,289 B1 | 3/2002 | Ishigama et al. | |
| 6,720,740 B2 * | 4/2004 | Toyama | 315/247 |
| 6,724,147 B2 * | 4/2004 | Moench et al. | 315/82 |
| 6,734,633 B2 * | 5/2004 | Matsuba et al. | 315/58 |
| 6,850,015 B2 * | 2/2005 | Ishizuka et al. | 315/224 |

FOREIGN PATENT DOCUMENTS

| | | |
|---|---|---|
| EP | 0483082 A2 | 4/1992 |
| EP | 0536535 A1 | 4/1993 |
| EP | 0883160 A1 | 12/1998 |
| JP | 4141988 | 5/1992 |
| JP | 8222381 | 8/1996 |
| JP | 8250287 | 9/1996 |
| JP | 2587718 | 12/1996 |
| JP | 9082480 | 3/1997 |
| JP | 11086795 | 3/1999 |
| JP | 11238488 | 8/1999 |
| JP | 3249145 | 11/2001 |
| JP | 2003151787 | 5/2003 |

OTHER PUBLICATIONS

Jun. 14, 2004 official Communication and European Search Report in. connection with corresponding European Patent Appl. No. EP 04 25 0988.

U.S. Appl. No. 10/633,426, filed Aug. 1, 2003, Ishizuka et al.

*15th Technical Meeting on Plasma Physics of Light Sources and its applications*, Illuminating Engineering Institute, Dec. 4, 2000, pp. 69–73 (exhibit 12).

Official Examination Report dated May 24, 2005 in connection with corresponding European Patent Application No. EP 04 250 988.5.

* cited by examiner

*Primary Examiner*—Don Wong
*Assistant Examiner*—Minh Dieu A
(74) *Attorney, Agent, or Firm*—John P. White, Esq.; Cooper & Dunham LLP

(57) ABSTRACT

There is disclosed a high-pressure metal-vapor discharge lamp lighting apparatus comprising control circuit constituted to supply a lamp power larger than a rated lamp power from lighting circuit and light a high-pressure metal-vapor discharge lamp and to subsequently control the lighting circuit in such a manner that the lamp power is successively reduced in accordance with predetermined reduction ratio characteristics to settle at the rated lamp power and to be capable of varying the reduction ratio characteristics in accordance with fluctuations of rising characteristics of a quantity of light in the high-pressure metal-vapor discharge lamp.

18 Claims, 8 Drawing Sheets

HIGH-PRESSURE METAL-VAPOR DISCHARGE LAMP LIGHTING APPARATUS AND HEADLIGHT DEVICE FOR AUTOMOBILE

CROSS-REFERENCE TO RELATED APPLICATIONS

This application is based upon and claims the benefit of priority from prior Japanese Patent Application No. 2003-47235, filed Feb. 25, 2003, the entire contents of which are incorporated herein by reference.

BACKGROUND OF THE INVENTION

1. Field of the Invention

The present invention relates to a high-pressure metal-vapor discharge lamp lighting apparatus which lights a high-pressure metal-vapor discharge lamp so as to raise a quantity of light of the lamp early, and a headlight device for a vehicle using the lighting apparatus.

2. Description of the Related Art

A method of starting or igniting a high-pressure gas discharge lamp for use in headlights of an automobile is described, for example, in Jpn. Pat. No. 3249145.

In this method, an AC (alternating-current) voltage is formed from a DC (direct-current) voltage of a battery, the AC voltage is supplied to an igniting apparatus in order to ignite the high-pressure gas discharge lamp, a lamp voltage and/or a lamp current is measured, and actual values of the lamp voltage and/or the lamp current are compared with target values. An auxiliary power is supplied in addition to an operation power of a high-pressure metal-vapor discharge lamp by a change of the AC voltage over a predetermined period after the igniting of the high-pressure gas discharge lamp, and the AC voltage is restricted by an allowable maximum lamp current on one hand, and is lowered after elapse of a predetermined period on the other hand. Furthermore, state values indicating values "lamp on" and "lamp off" are formed, and the auxiliary power (ZL) to be formed after the igniting is increased with an increase of a cutoff (off) period of time and with a decrease of a period of the previous lighting (on) time. Moreover, a period (T) in which the auxiliary power (ZL) is effective increases with the increase of the cutoff period of time and with the decrease of the period of the previous lighting period of time of the high-pressure gas discharge lamp.

On the other hand, at present, for the high-pressure discharge lamp for use in a lighting apparatus for an automobile, mainly mercury for forming the lamp voltage which is a main luminescent material for obtaining a white light, sodium Na and scandium Sc which are halides, and xenon which functions as a starting gas and buffer gas to compensate for emission immediately after the lighting are respectively sealed into a luminous tube. Therefore, the high-pressure discharge lamp constitutes a metal halide lamp which is one type of high-pressure metal-vapor discharge lamp. It is to be noted that the high-pressure discharge lamp whose main discharge medium is a metal-vapor is classified as the high-pressure metal-vapor discharge lamp, and the high-pressure discharge lamp whose main discharge medium is gas is classified as the high-pressure gas discharge lamp.

On the other hand, mercury is a material large in environmental load, and the invention for removing this material is described, for example, in U.S. Pat. No. 6,353,289. That is, in the invention described in the U.S. Pat. No. 6,353,289, halide of a metal which is comparatively high in steam pressure and which does not easily emit light in a comparatively visible range is added as a second halide to a first halide of a luminous metal, and at least xenon having an atmospheric pressure or more is sealed into an airtight container having fire resistance and transmittance. A light in a chromaticity range of the white light is emitted immediately after the lighting by a combination of the first and second halides and xenon in the airtight container in the metal halide lamp, that is, the high-pressure metal-vapor discharge lamp. This conventional invention has realized an automobile headlight including the high-pressure metal-vapor discharge lamp (hereinafter referred to as "mercury-free lamp" for convenience in the specification) in which mercury is not substantially sealed.

When a quantity of light indicating a predetermined value or more is required in a predetermined time from the lighting is required as in the high-pressure metal-vapor discharge lamp for use in the headlight for the automobile, a lamp power larger than a rated lamp power is supplied at a starting time at a temperature of so-called room temperature to reduce a rising time of the quantity of light. This technique is known, for example, by the Jpn. Pat. No. 3249145. When this technique is applied to the conventional high-pressure metal-vapor discharge lamp (hereinafter referred to as the "mercury-containing lamp" for the convenience) using mercury to form the lamp voltage, first mercury having a low boiling point evaporates to emit light. With a rise of the temperature in the tube, the halide of the luminous metal evaporates to contribute to desired emission. Therefore, when the quantity of light obtained by the mercury emission is not less than the predetermined value first in the starting, the initial emission contribution of the luminous metal can be provided over a comparatively long time. For example, even with the lighting with a large power of about 70 W immediately after the starting, a steam pressure of mercury is saturated in about one to two seconds. Thereafter, even with the lighting at a lamp power smaller than 70 W, a quantity of light equal to that at a stable time can be anticipated, and several tens of seconds can be spent from when the evaporation of the halide of the luminous metal starts until the emission by the luminous metal becomes dominant. Therefore, even with fluctuations in a shape of the high-pressure discharge lamp, a charged amount of the halide of the luminous metal, a distributed state of the halide sticking to the inside of the tube and the like, comparatively stable rising characteristics of corresponding quantity of light can be obtained. However, there has been a demand for more stable rising characteristics of the quantity of light.

On the other hand, for the mercury-free lamp, since the emission of mercury cannot be expected in a starting initial stage, rare gases such as xenon first emit light, and subsequently the emission of the luminescent metal charged as the halide starts.

Additionally, in the mercury-free lamp, a very high temperature is required for the evaporation of the halide of the luminous metal as compared with mercury. Therefore, when the quantity of light equal to that of the mercury-containing lamp is to be obtained in an equal time, the lighting at the lamp power higher than a rated lamp power by 2.5 times or more has to be projected for a time much longer than that in the mercury-containing lamp. Additionally, when the high lamp power is projected, a phenomenon occurs in which the charged metal halide rapidly evaporates and the quantity of light is twice or three times that stabilized under the rated lamp power.

When the rapid evaporation of the metal halide occurs without any control in the mercury-free lamp as described above, the emission occurs with a quantity of light much larger than a rated quantity of light. As a result, for the headlight device for the automobile, a driver of an oncoming car is intensely dazzled, and this is remarkably dangerous.

Moreover, the mercury-free lamp does not have the emission by mercury. Therefore, even when the projected lamp power is constant, the rising characteristics of the quantity of light in the high-pressure metal-vapor discharge lamp remarkably fluctuate by fluctuations at a manufacturing time. That is, the fluctuations of the rising characteristics of the quantity of light cannot be predicted in consideration of a manufacturing tolerance of the high-pressure metal-vapor discharge lamp. That is, a processing precision of the airtight container, a charged amount or constituting ratio of the halide of the discharge medium, rare gas charged pressure or the like cannot strictly be managed. Moreover, since the high-pressure discharge lamp is constituted of elements that easily fluctuate the rising characteristics of the quantity of light, the rising characteristics of the quantity of light easily fluctuate in a broad range. The fluctuations of the rising characteristics of the quantity of light basically similarly occur both in the mercury-containing lamp and the mercury-free lamp. However, the mercury-free lamp requires a large power at the starting time as compared with the mercury-containing lamp as described above. Additionally, since the steam pressure of the second halide is higher than that of mercury, the lamp characteristics are easily influenced by the fluctuations.

Moreover, a delay is generated in a time required until the quantity of light is stabilized at a set value because of the fluctuations of the rising characteristics of the quantity of light in the high-pressure metal-vapor discharge lamp, and the quantity of light does not successively or smoothly rise. For example, when the high-pressure discharge lamp is lit, the quantity of light temporarily lowers below a rated value, or largely exceeds the rated value in some case.

FIGS. 9A, 9B show changes of a projected lamp power and quantity of light with respect to a lighting time in two conventional different high-pressure metal-vapor discharge lamps, FIG. 9A is a graph of a lamp which is slow in the rising of the quantity of light, and FIG. 9B is a graph of a lamp in which over-emission occurs. It is to be noted that the graph having the ordinate denoted with W shows a change of the projected lamp power with respect to the elapse of time (t), and the graph including the ordinate denoted with lx shows illuminance. Therefore, the change of the quantity of light with respect to the elapse of time (t).

That is, in FIGS. 9A and 9B, the rising characteristics of the quantity of light of the mercury-free lamp are slow. On the other hand, the lamp power drops excessively early. Therefore, the quantity of light once drops. Therefore, extra time is required until the quantity of light is restored again. Eventually, the time lengthens until the quantity of light rises and is stabilized. On the other hand, FIG. 9B shows a case where the rising characteristics of the quantity of light of the mercury-free lamp are early. Even when the lamp power starts dropping, the quantity of light increases excessively early, the reduction of the lamp power does not follow, and the over-emission occurs. It is to be noted that in FIGS. 9A and 9B, the reduction time of the lamp power from the start of the reduction of the lamp power until the rated lamp power is reached is equal at t1.

Moreover, with the high-pressure metal-vapor discharge lamp used in the automobile headlight device, as shown in FIG. 9A, although the headlight device is lit, the quantity of light drops. In this case, visibility drops, and this results in a dangerous state. When the over-emission occurs even temporarily, the oncoming car is intensely dazzled, and this is dangerous.

On the other hand, the rising characteristics of the quantity of light have a dynamic or transient phenomenon, different from the characteristics at a stable time, and therefore the characteristics are not easily managed at the manufacturing time of the high-pressure metal-vapor discharge lamp. Therefore, when the fluctuations of the rising characteristics of the quantity of light are reduced from an manufacturing aspect of the high-pressure metal-vapor discharge lamp, very much trouble and time are required for strictly managing the shape of the airtight container, managing the charged amount of the halide of the discharge medium for each layer, or subtly adjusting the charged gas pressure.

To solve the above-described problem, in accordance with the starting method described in the Jpn. Pat. No. 3249145, in the mercury-free lamp, an average time for which the rapid evaporation of the metal halide occurs is assumed, and the reduction of the projected lamp power is started. However, there are the influences of the rising characteristics of the quantity of light of the high-pressure metal-vapor discharge lamp. That is, in the invention of the Jpn. Pat. No. 3249145, the fluctuations of the rising characteristics of the quantity of light of the high-pressure metal-vapor discharge lamp are not considered. Therefore, the invention described in the Jpn. Pat. No. 3249145 cannot be a solution of the problem caused by the fluctuations of the lamp characteristics of the high-pressure metal-vapor discharge lamp.

On the other hand, the present inventor has developed the invention to solve the above-described problem in the mercury-free lamp. The invention has been applied as Jpn. Pat. Appln. No. 2002-54080 (hereinafter referred to as the "prior application" for the convenience). The invention of the prior application comprises control circuit for controlling lighting circuit to reduce the lamp power to such an extent that a light output is not remarkably large as compared with that at the stable time and does not rapidly increase and for further successively attenuating the lamp power so that the lamp power settles at the rated lamp power, when the lamp power twice the rated lamp power is supplied from the lighting circuit to start the high-pressure discharge lamp and thereafter at least the metal halide charged in the high-pressure discharge lamp rapidly evaporates. The invention of the prior application is solving circuit effective to some degree against the problem caused by the fluctuations of the lamp characteristics of the mercury-free lamp.

However, when the solving circuit effective against the problems caused by the fluctuations of the rising characteristics of the quantity of light of the high-pressure metal-vapor discharge lamp is obtained with a simpler constitution and/or further inexpensively, practical values are high.

BRIEF SUMMARY OF THE INVENTION

According to a first aspect of the present invention, there is provided a high-pressure metal-vapor discharge lamp lighting apparatus comprises: control circuit for supplying a lamp power larger than a rated lamp power from a lighting circuit to light a high-pressure metal-vapor discharge lamp; thereafter successively reducing the lamp power in accordance with predetermined reduction ratio characteristics to the lighting circuit so that the lamp power settles at the rated lamp power and the reduction ratio characteristics can be varied in accordance with fluctuations of rising characteristics of a quantity of light in the high-pressure metal-vapor discharge lamp.

Here, the control circuit controls the lighting circuit, described later, of the high-pressure metal-vapor discharge lamp.

In a case where the high-pressure metal-vapor discharge lamp is lighting in such a manner that the quantity of light rises early, the power larger than the rated lamp power, that is, a maximum power is projected at a starting time, that is, a lighting start time, and thereafter the power is successively reduced with the rising of the quantity of light until the power reaches the rated lamp power to shift to a stable lighting state. When an elapse until the stable lighting from the lighting start is divided by the time, the elapse can roughly be divided in a first time slot to project the maximum power and a second time slot to successively reduce the lamp power. It is to be noted that with the mercury-free lamp, a time slot to rapidly evaporate a metal halide is disposed between the first and second time slots.

(Control in First Time Slot)

In the first time slot, a control at the starting time is executed. In the control at the starting time, the control is literally executed at the starting time of the high-pressure metal-vapor discharge lamp, that is, at the lighting start time for a main purpose of quickly raising the quantity of light until an allowable minimum illuminance is obtained. For this purpose, the maximum power is projected. In the mercury-free lamp, it is general to set the maximum power to be about twice the rated lamp power. On the other hand, it is preferable to set the lamp power to an appropriate value in a range more than twice and less than three times the rated lamp power in the mercury-free lamp. That is, when the rated lamp power is 35 W, the high-pressure metal-vapor discharge lamp is preferably lit in a range of about 76 to 110 W. At the starting time, the discharge mainly by xenon which is a rare gas occurs, and a gas pressure is substantially constant or gradually rises. Therefore, in a constant-current lighting, the projected lamp power is substantially constant. By the control at the starting time, the high-pressure metal-vapor discharge lamp produces a light output which is about 50% of a light output at a rated lighting time by the discharge of the rare gas. It is to be noted that a time for which the control at the starting time, that is, the control to project the maximum power is executed is generally about one to five seconds, preferably two to four seconds. In actual, the time differs with a mercury-containing lamp and the mercury-free lamp. The maximum power projection time at the starting time is about one to two seconds in the former case, but about two to five seconds in the latter case.

(Control in Second Time Slot)

In the second time slot, a characteristic constitution in the present invention functions, and the lamp power is successively reduced so as to settle at the rated lamp power. The time slot is about one minute after the starting. In the present invention, in the control in this period, reduction ratio characteristics of the lamp power which are suitable for the fluctuations of the rising characteristics of the quantity of light in the high-pressure metal-vapor discharge lamp are applied. That is, the reduction ratio characteristic that the lamp power is reduced early are generally selected with respect to the high-pressure metal-vapor discharge lamp having the early rising characteristics of the quantity of light. The reduction ratio characteristic that the lamp power is reduced slowly are generally selected with respect to the high-pressure metal-vapor discharge lamp having the slow rising characteristics of the quantity of light. Therefore, in the aspect of the present invention, it is possible to select at least two or more types of the reduction ratio characteristics. Preferably the reduction ratio characteristic that the lamp power is reduced to an intermediate degree can be selected in a case where the rising characteristics of the quantity of light are intermediate. Further preferably the intermediate reduction ratio characteristics have a plurality of different levels, and an appropriate reduction ratio characteristic can be selected from the characteristics if necessary.

Moreover, the change of the reduction ratio characteristics of the lamp power in the second time slot may be either stepwise or continuous. The reduction ratio characteristics may manually be changed, but preferably the rising characteristics of the quantity of light are judged to automatically change a reduction ratio to a suitable reduction ratio. It is to be noted that for judgment of the rising characteristics of the quantity of light, for example, the lamp voltage or a voltage corresponding to the lamp voltage is detected, and a degree of the change, that is, a change ratio is calculated from a detected value to monitor an electric change in the lighting circuit, so that the judgment can indirectly be performed. The rising characteristics of the quantity of light may also optically and directly be detected, but by the indirect judgment, the high-pressure metal-vapor discharge lamp lighting apparatus can be relatively inexpensive.

Furthermore, to reduce the lamp power, a target value is set beforehand such that the lamp power decreases with an elapse of time, an actual lamp power is compared with a target value, and the lighting circuit is controlled so as to bring the actual value close to the target value, so that the lamp power is reduced. Therefore, the reduction ratio characteristics of the lamp power at this time is determined by the reduction ratio of the target value. However, the reduction ratio is a standard value set beforehand, for example, by a designer, and does not necessarily conform to the individual high-pressure metal-vapor discharge lamps. In accordance with the aspect of the present invention, the reduction ratio characteristics of the lamp power which conform to the rising characteristics of the quantity of light possessed by each high-pressure metal-vapor discharge lamp are set as follows in one example. For example, the control circuit includes variable reduction ratio correction circuit for correcting the reduction ratio characteristics of the lamp power. The reduction ratio correction circuit corrects the reduction ratio by the preset target value of the lamp power (e.g., the target lamp power) so that the reduction ratio conforms to each high-pressure metal-vapor discharge lamp.

Another constitution in the control circuit, that is not a characteristic constitution relating to the control circuit in the aspect of the present invention, will hereinafter be described. These constitutions can optionally be selected and used as desired.

(Control at the time of Rapid Evaporation of Metal Halide)

In the mercury-free lamp, a period in which the metal halide rapidly evaporates exists between the first and second time slots. At this time, it is preferable to execute the following control. That is, in the control at the time of the rapid evaporation of the metal halide, it is important to narrow down the lamp power in such a manner that a light output is not remarkably large as compared with that at a stable period of time, when the metal halide rapidly evaporates and that the light output does not rapidly increase. However, when a timing to narrow down the lamp power is excessively early, and the lamp power is largely narrowed down before the metal halide rapidly evaporates, the light output largely drops as compared with that at the stable period of time. Therefore, it is necessary to perform the narrowing-down at an appropriate timing or to an appropriate degree. It is to be noted that when "the light output is not remarkably large as compared with that at the stable period of time" at the time of the rapid evaporation of the metal halide, the light output is in a range which does not exceed twice, preferably 1.5 times the light output at the stable period of time.

That is, when the lamp power is narrowed down at an appropriate timing to execute a satisfactory control, the time of the rapid evaporation of the metal halide is detected, and the supplied lamp power may be narrowed down quickly at the detection time. Then, even when the characteristics of the individual high-pressure discharge lamps fluctuate, the influences are not reflected, and the control can be executed so as to obtain a desired light output. Also in the control, it is possible to sufficiently narrow down the lamp power to a required degree.

On the other hand, when the lamp power is narrowed down to the appropriate degree to execute the satisfactory control, an appropriate time width in a range as small as possible is set beforehand so as to include a timing at which the metal halide rapidly evaporates in consideration of the fluctuations of the individual characteristics of the high-pressure discharge lamp, and the lamp power supplied at the starting time may be attenuated with an deliberately considered attenuation ratio indicating an appropriate value in the time width. An intermediate attenuation ratio smaller than the above-described attenuation ratio is applied as the attenuation ratio of the lamp power applied in this period. It is to be noted that the time width is generally about 0.4 to 4 seconds (about 1.4 to 10 seconds after the starting), preferably about 1 to 2 seconds (about 3 to 6 seconds after the starting).

In this case, even when the lamp power is narrowed down slightly before the timing at which the metal halide rapidly evaporates, the light output does not increase/decrease excessively beyond a required range, that is, can be set within the allowable range. The "allowable range" of the light output is a range of 50 to 200%, preferably 50 to 150% of the light output at the stable period of time.

(Method of Controlling the Lamp Power)

The lamp power can be controlled by the change of a reference power in a negative feedback constant power control system. It is to be noted that with the high-pressure discharge lamp of the present embodiment, the lamp power is determined by the evaporation pressure of the metal halide. Therefore, when a constant lamp current control is performed, a constant lamp power control can be performed. The control circuit is constituted to send, for example, a PWM control signal for negative feedback control to the lighting circuit.

(High Temperature Starting)

The present embodiment provides means for solving problems in a lamp power control during the starting at low temperature such as room temperature as described above. Therefore, any constitution may also be used at the time of high-temperature starting such as so-called hot restart of the high-pressure metal-vapor discharge lamp, but the following constitution is preferably used. It is to be noted that the "high-temperature starting" means the starting at a temperature higher than room temperature, for example, a temperature close to that at the stable period of time of the high-pressure discharge lamp, and therefore the hot restart corresponds to this.

That is, the lamp power close to the rated lamp power is supplied at the high-temperature starting. It is to be noted that the power "close to the rated lamp power" is in a range of 105 to 150% with respect to the rated lamp power. The low-temperature starting time can be distinguished from the high-temperature starting time in accordance with the temperature of the high-pressure discharge lamp, a lights-out time which is a time elapsed after the start of the lamp, or a magnitude of the lamp current flowing at the lighting time. Furthermore, for the control of the lamp power to be supplied to the high-pressure discharge lamp, for example, the voltage applied to the high-pressure discharge lamp is changed to facilitate the control. In short, the supplied lamp power can continuously be controlled in accordance with the lights-out elapsed time of the high-pressure discharge lamp. Furthermore, the lamp power to be supplied to the high-pressure discharge lamp at the high-temperature starting time can be determined beforehand by experiments or simulations. Moreover, a relation between the degrees of the low and high temperatures and a watt-hour supplied to the lamp is stored as table data beforehand in a memory, and necessary data is read from the memory based on calculation, so that the lighting circuit can automatically be controlled.

<High-pressure Metal-vapor Discharge Lamp>

The high-pressure metal-vapor discharge lamp lit by the embodiment of the present invention is the high-pressure discharge lamp which emits light by high-pressure discharge of metal-vapor in the discharge medium. Moreover, there is a so-called mercury-containing lamp which contains mercury in the discharge medium and a so-called mercury-free lamp containing the second halide instead of mercury, and the embodiment of the present invention may relate to either of them. The discharge medium will hereinafter be described in the mercury-free lamp to which the present embodiment is especially effectively applied, because the fluctuations of the rising characteristics of the quantity of light are large.

(Discharge Medium in Mercury-free Lamp)

Mercury is not essentially charged in the discharge medium in the mercury-free lamp. "Mercury is not essentially charged" means that mercury is not charged at all or that mercury exists by less than 2 mg per 1 cc of an inner capacity of the airtight container, preferably 1 mg or less. However, it is desirable for the environment not to charge mercury at all. To maintain electric characteristics of the discharge lamp by mercury vapor as in the related art, 20 to 40 mg of mercury per 1 cc or the inner capacity of the airtight container, or 50 mg or more as the case may be, has been charged in a small-sized high-pressure metal-vapor discharge lamp whose distance between electrodes is comparatively small. From this, the mercury amount can be said to be substantially small.

Next, the rare gas is charged. The rare gas is preferably xenon. A reason why the rare gas is charged is that the gas functions as a starting gas, the quantity of light is quickly raised immediately after the start of lighting, and the gas is allowed to function as a buffer gas during stable lighting. For this, the rare gas is charged at a high pressure, for example, generally 5 to 20 atmospheres, preferably 8 to 16 atmospheres. In this range, the rising of the quantity of light is advanced up to four seconds immediately after the lighting, and it is possible to easily obtain a luminous intensity of 8000 cd in a representative point in the front surface of the headlight device for the automobile, required for the device.

Furthermore, the metal halide is charged. It is assumed that the metal halide contains at least the first halide which is a halide of a luminescent material and the second halide for forming the lamp voltage. Examples of the first halide for white emission in which the headlight for the automobile include sodium Na, scandium Sc and rare earth meals, and the halide of a luminescent metal containing at least one selected from the group consisting of dysprosium Dy. The halide of sodium Na, scandium Sc, and indium I may be charged as the halide of the luminescent metal.

The second halide comprises a metal whose evaporation pressure is relatively high and whose light emission in a visible range is relatively little. The examples of the metal for use in the second halide include one type or a plurality of types of metals selected from the group consisting of magnesium Mg, iron Fe, cobalt Co, chromium Cr, zinc Zn, nickel Ni, manganese Mn, aluminum Al, antimony Sb, beryllium Be, rhenium Re, gallium Ga, titanium Ti, zirconium Zr, and hafnium Hf.

As described above, for the mercury-free lamp, the metal halide is charged as the discharge medium instead of conventional mercury. Therefore, when the lighting is started with the lamp power twice the rated lamp power, the metal halide rapidly evaporates in some time. Moreover, when any special control is not executed in this case, there are characteristics that the light output is remarkably large and that the output rapidly increases.

(Other Constitution of High-pressure Metal-vapor Discharge Lamp)

The following constitutions are not essential requirements in the high-pressure metal-vapor discharge lamp to be lit in the present embodiment, but are added as desired, and this is effective especially for the headlight device for the automobile.

1. (Airtight Container) A discharge space is formed inside the airtight container, a thickness of a portion of the container surrounding the discharge space is comparatively large, and the container is formed of fire-resistant materials having transmittance, such as quartz glass and transmittance ceramic. The discharge space preferably has a substantially columnar shape, and the thickness of a middle part of the pace in an axial direction is larger than that on opposite sides.

2. (Electrodes) A pair of electrodes facing each other are sealed inside opposite ends of the airtight container, and a distance between the electrodes is set to preferably 5 mm or less, more preferably 4.2±0.6 mm. Direct-current lighting is allowed to be performed at the starting time, but when each of the one pair of electrodes functions as an anode, and even when the lamp power about twice or more the rated lamp power is supplied, the electrodes can bear this, for example, by a spherical portion formed on a tip of the each electrode and having a diameter larger than that of a shaft portion connected to the tip portion.

3. (Rated Lamp Power) The rated lamp power is generally 250 W or less, preferably 100 W or less, most preferably 60 W or less. In the high-pressure metal-vapor discharge lamp for use in the headlight device for the automobile, the rated lamp power is generally 80 W or less, preferably 60 W or less, most preferably about 35 W.

4. (Outer Tube) An outer tube is translucent container-like member disposed so as to surround the airtight container including the discharge space inside from the outside. The outer tube cuts off ultraviolet rays radiated to the outside from the airtight container, or protects the airtight container. The inside of the outer tube may be communicated with the outside air or may be airtight.

<Lighting Circuit>

The lighting circuit is a circuit section for lighting the high-pressure metal-vapor discharge lamp, and controls an electric energy required for maintaining a lit state with respect to the high-pressure metal-vapor discharge lamp while supplying the electric energy. For this, the lighting circuit is capable of changing the lamp power to be supplied to the high-pressure metal-vapor discharge lamp in accordance with the control by the above-described control circuit and restricting the lamp current by a ballast function to stably light the high-pressure metal-vapor discharge lamp. It is to be noted that the high-pressure metal-vapor discharge lamp may be lit by urging by either direct current or alternating current. For example, the direct-current lighting is performed for a required period of time from the starting time, and is thereafter switched to the alternating-current lighting. In either case, the lighting circuit is preferably constituted in an electric system because of easiness, exactness and response of the control. Moreover, a waveform of the AC voltage may be rectangular. Furthermore, constant power control may be executed during the stable lighting of the high-pressure metal-vapor discharge lamp.

Next, current-limiting circuit of the high-pressure metal-vapor discharge lamp has to have an appropriate impedance in accordance with a mode of the voltage applied to the high-pressure metal-vapor discharge lamp. However, when a switching regulator is used to control a DC power voltage value as desired and to achieve an active filter function, an inductor that is one of constituting elements also performs a current-limiting function by switching, and therefore an apparent current-limiting device may be omitted.

Moreover, a frequency at the time of the alternating-current lighting needs to be considered in such a manner that the high-pressure discharge lamp does not cause acoustic resonance phenomenon. When the high-pressure metal-vapor discharge lamp includes a discharge container having a comparatively small size for use in the headlight device for the automobile, a frequency of about 2 kHz or less does not cause any actual problem.

A non-load output voltage of the lighting circuit may be set to about 200 to 600 V.

<Other Constitution in the Embodiment of the Present Invention>

An igniter may be added as desired. With the use of the mercury-free lamp, although a pulse output voltage of the igniter needs to be slightly higher than that in the mercury-containing lamp, it is not difficult to realize the appropriate cost, size, and weight.

<Function of the Present Embodiment>

In the present embodiment, the reduction ratio characteristics of the lamp power of the control circuit for controlling the lighting circuit is changed so as to conform to the rising characteristics of the quantity of light in accordance with the fluctuations of the rising characteristics of the quantity of light in the high-pressure metal-vapor discharge lamp. Therefore, when the high-pressure metal-vapor discharge lamp is started at a room temperature, the quantity of light can exactly and smoothly be raised so as to successively increase. Moreover, since the quantity of light is prevented from once dropping during the rising of the quantity of light, the quantity of light quickly rises up to a defined quantity of light.

According to another aspect of the present invention, there is provided a high-pressure metal-vapor discharge lamp lighting apparatus comprising: a lamp voltage detection circuit for detecting a voltage corresponding to a lamp voltage of a high-pressure metal-vapor discharge lamp; and a control circuit for supplying a lamp power larger than a rated lamp power from lighting circuit to light the high-pressure metal-vapor discharge lamp and for thereafter successively reducing the lamp power in accordance with predetermined reduction ratio characteristics to control the lighting circuit so as to allow the lamp power to settle at the rated lamp power and for changing the reduction ratio characteristics in accordance with a change ratio of a detected output of the lamp voltage detection circuit.

The control circuit includes the lamp voltage detection circuit for detecting the voltage corresponding to the lamp voltage. When the lamp voltage detection circuit "detects the voltage corresponding to the lamp voltage of the high-pressure metal-vapor discharge lamp", it is meant that the circuit may not only directly detect the lamp voltage of the high-pressure metal-vapor discharge lamp but also detect a voltage proportional to the lamp voltage appearing on a power supply side of the lighting circuit.

Moreover, the control circuit is constituted to change the reduction ratio characteristics of the lamp power in accordance with the change ratio of a detection output of the lamp voltage detection circuit. That is, the change ratio of the lamp voltage may be obtained to monitor the change ratio, so that the rising characteristics of the quantity of light of the high-pressure metal-vapor discharge lamp can be judged. For the change ratio of the lamp voltage, for example, the detected value of the lamp voltage detection circuit is stored in a memory for each short unit time, and the detected value in the next unit time is compared/calculated with the previous detected value read from the memory, so that the change ratio of the lamp voltage can be obtained. The detected value of the lamp voltage detection circuit is compared/calculated with a target lamp voltage obtained from a target lamp power at this time, so that the change ratio of the lamp voltage can be obtained.

Moreover, when the change ratio of the lamp voltage is large, and when the quantity of light rises early, the reduction ratio of the lamp power is corrected so as to be large. Conversely, when the change ratio is small, and when the quantity of light rises late, the reduction ratio is corrected so as to be small. However, for the fluctuations of the rising characteristics of the quantity of light in the high-pressure metal-vapor discharge lamp, a correlation of the fluctuation and the change ratio of the lamp voltage is sometimes reversed depending on whether a factor of the fluctuation is dominantly the shape of the airtight container or the ratio of the metal halide. Therefore, as the case may be, the above-described relation between the change ratio of the lamp voltage and the reduction ratio of the lamp power may also be reversed.

Furthermore, the control circuit may include lamp current detection circuit in addition to the lamp voltage detection circuit. It is to be noted that the lamp current detection circuit may not only directly detect the lamp current actually flowing in the high-pressure metal-vapor discharge lamp but also detect a current proportional to the lamp current to indirectly detect the lamp current.

Moreover, when the control circuit includes the lamp voltage detection circuit and the lamp current detection circuit, it is possible to obtain an actual lamp power projected in the high-pressure metal-vapor discharge lamp, that is, an actual lamp power by the calculation.

Furthermore, in another aspect of the present invention, when a microcomputer is used in the control circuit, the calculation can easily be performed. Moreover, table data of the target lamp power to the lighting period of time is stored beforehand in the memory in the microcomputer, and the table data is read with the elapse of the lighting period of time to perform the negative feedback control so as to eliminate a difference from an actual lamp power, so that it is possible to light the high-pressure metal-vapor discharge lamp in accordance with the target lamp power.

The aspect of the present invention comprises: a control circuit for monitoring the change ratio of the lamp voltage and judging the rising characteristics of the quantity of light of the high-pressure metal-vapor discharge lamp, so that the reduction ratio of the lamp power changes so as to conform to the rising characteristics of the quantity of light in accordance with the judgment results. Accordingly, the supply of the lamp power is automatically and appropriately adjusted with respect to the fluctuations of the rising characteristics of the quantity of light in the high-pressure metal-vapor discharge lamp. As a result, the quantity of light smoothly rises without any special operation, and the quantity of light rises early.

According to still another aspect of the present invention, in the high-pressure metal-vapor discharge lamp lighting apparatus, the control circuit includes variable reduction ratio correction circuit for correcting the reduction ratio characteristics of the lamp power.

In each aspect of the present invention, a preferable constitution is defined to reduce the lamp power in accordance with the reduction ratio of the lamp power in conformity to the fluctuations of the rising characteristics of the quantity of light in the high-pressure metal-vapor discharge lamp. That is, the control circuit includes a reduction ratio correction circuit which is constituted to reduce the lamp power of the high-pressure metal-vapor discharge lamp at a predetermined first reduction ratio in the second time slot described in the first aspect of the present invention and which is variable so as to correct the first reduction ratio to obtain a second reduction ratio.

The first reduction ratio may be, for example, a standard reduction ratio. However, in short, a reduction ratio which is relatively larger than the standard reduction ratio or which conversely deviates to be small is allowed to be the first reduction ratio. The first reduction ratio may also be set, for example, in the form of the target lamp power. In this case, for the target lamp power, the transition of the target lamp power with respect to the elapse of the time is stored as the table data in the memory, and the table data is successively read from the memory with the elapse of time and compared with the actual lamp power. Moreover, the power supplied in the lighting circuit is controlled to approach the target lamp power in accordance with a difference between both the lamp powers. As a result, the lamp power is reduced along the first reduction ratio.

The second reduction ratio is obtained as a result of the correction of the first reduction ratio by the variable reduction ratio correction circuit. Therefore, the second reduction ratio is a reduction ratio of the lamp power in conformity to the rising characteristics of the quantity of light in the high-pressure metal-vapor discharge lamp to be lit. The concrete constitution of the variable reduction ratio correction circuit is not especially limited, but may also be constituted, for example, of a time constant circuit. Moreover, the time constant is set to be variable. To set the time constant to be variable, for example, an electronic volume is used to input a change ratio signal of the lamp voltage into a control terminal, or a control input corresponding to the change ratio signal may also manually be provided. A plurality of time constant circuits having different time constants may be arranged in parallel with one another or in a switchable manner, and an appropriate time constant circuit may be selected in accordance with the change ratio of the lamp voltage. Moreover, after correcting the target lamp power by the variable reduction ratio correction circuit, the difference between the actual lamp power and the corrected target lamp power is obtained by an operating amplifier, and the lighting circuit is subjected to the negative feedback control by the difference, so that the lamp power can be reduced at the reduction ratio in conformity to the rising characteristics of the quantity of light of the high-pressure metal-vapor discharge lamp.

Furthermore, when the microcomputer is used in the control circuit, a plurality of different reduction ratio data for the correction are stored as the table data in addition to the target lamp power beforehand in the memory. Moreover, the appropriate data is selected and read from the table data for the correction in accordance with the change ratio of the lamp voltage, and may also be corrected in the same manner as described above.

In the aspect of the present invention, when the high-pressure metal-vapor discharge lamp reaches the second time slot after the starting, to start the reduction of the lamp power toward the rated lamp power in accordance with the control by the control circuit, the variable reduction ratio correction circuit corrects the reduction ratio with respect to the first reduction ratio set beforehand, and successively reduces the lamp power at the second reduction ratio in conformity to the rising characteristics of the quantity of light of the high-pressure metal-vapor discharge lamp to be lit. As a result, the lamp power is smoothly and quickly reduced. The reduction ratio can easily and securely be corrected.

The high-pressure metal-vapor discharge lamp according to another aspect of the present invention contains the first halide comprising the halide of the luminescent metal and the second halide for forming the lamp voltage, and does not essentially contain mercury.

In another aspect of the present invention, it is defined that the so-called mercury-free lamp is used as the high-pressure metal-vapor discharge lamp. As described above, with the mercury-free lamp, since there are a lot of fluctuations of the rising characteristics of the quantity of light, the first aspect or the first embodiment is especially effective.

In the high-pressure metal-vapor discharge lamp lighting apparatus of still another aspect of the present invention, the control circuit maintains the lamp power at a maximum power for a predetermined time after the lighting start, and successively reduces the lamp power in accordance with predetermined reduction ratio characteristics.

In the present aspect of the invention, "the predetermined time" indicates the first time slot as described in the first aspect of the present invention, and is generally about one to five seconds, preferably about two to four seconds as described above. In actual, the time differs with the mercury-containing lamp and mercury-free lamp. The maximum power supplying period of time at the lamp starting is about one to two seconds in the former case, but is about two to five seconds in the latter case. Moreover, the control at the starting time is performed in this time slot.

Moreover, "the maximum power" indicates a maximum power in the allowable range set beforehand, and the appropriate values are in a range of about twice the rated lamp power for the mercury-containing lamp, and in a range more than twice and less than three times that for the mercury-free lamp. When the maximum power is supplied in the control at the starting time, that is, at the lighting start time, the quantity of light is raised early. Furthermore, "the predetermined reduction ratio characteristics" indicate the reduction ratio characteristics of the lamp power in conformity to the rising characteristics of the quantity of light of the high-pressure metal-vapor discharge lamp to be lit.

Moreover, in the aspect of the present invention, the quantity of light at the starting time can be raised early by the above-described constitution.

According to still another aspect of the present invention, there is provided a headlight device for a vehicle comprising: a headlight device main body for the vehicle; and the high-pressure metal-vapor discharge lamp lighting apparatus according to any one of the above-described aspects, disposed in the headlight device main body for the vehicle.

The "headlight device main body for the vehicle" indicates a remaining part of the headlight device for the vehicle from which the high-pressure metal-vapor discharge lamp lighting apparatus is removed.

Moreover, in the aspect of the present invention, with the high-pressure metal-vapor discharge lamp lighting apparatus of each of the above-described aspects, even when there are the fluctuations of the rising characteristics of the quantity of light in the individual high-pressure metal-vapor discharge lamps, it is possible to reduce the lamp power at the reduction ratio of the lamp power in conformity to the rising characteristics of the quantity of light possessed by each high-pressure metal-vapor discharge lamp at the rising time of the quantity of light. As a result, there can be obtained the headlight device for the vehicle in which the quantity of light smoothly and quickly rises.

DETAILED DESCRIPTION OF THE INVENTION

Embodiments of the present invention will hereinafter be described with reference to the drawings.

<First Embodiment>

One embodiment of a high-pressure metal-vapor discharge lamp lighting apparatus according to the present invention will be described in detail with reference to FIGS. 1 to 4C.

Figure 1:
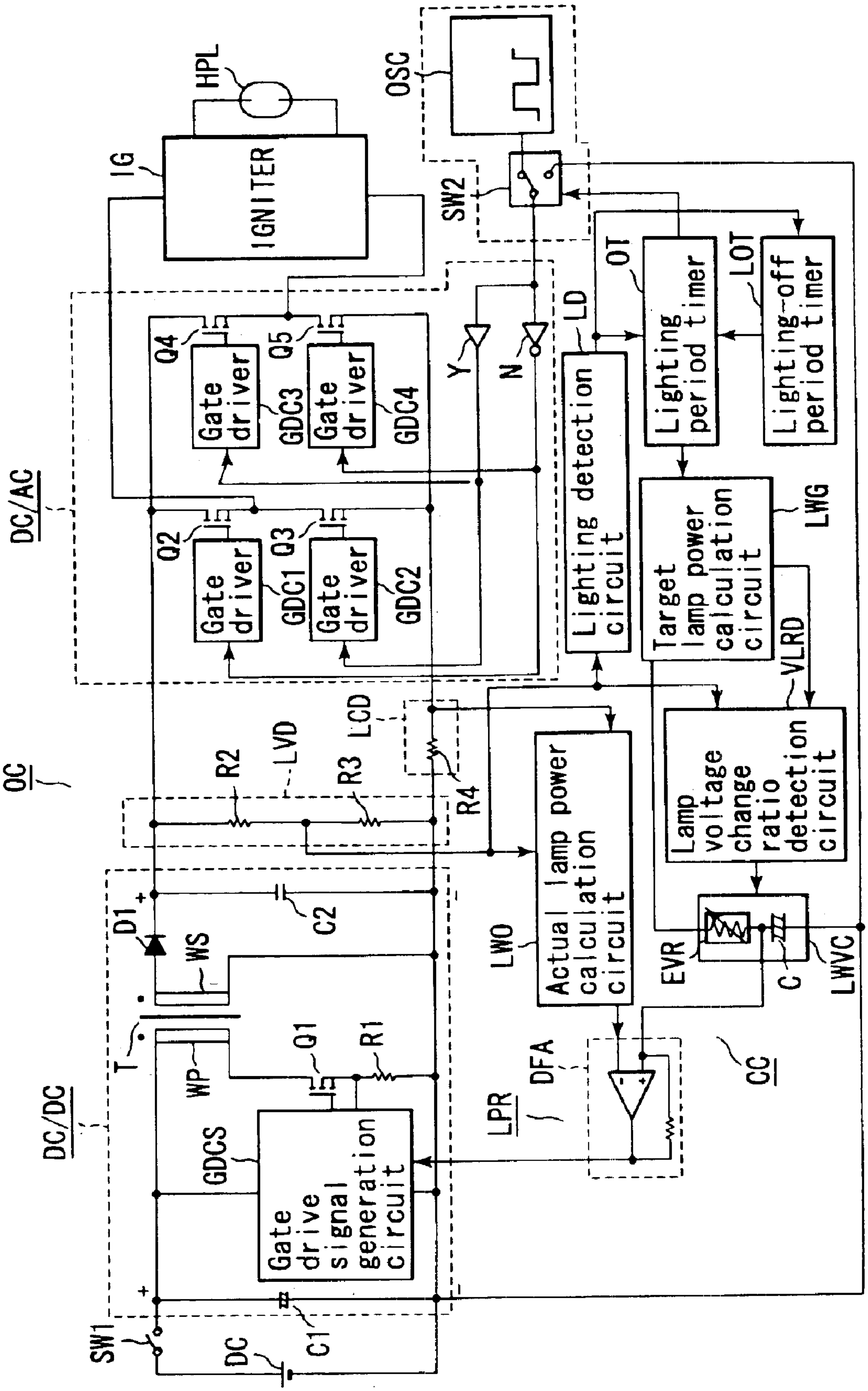
FIG. 1 is a block circuit diagram showing one embodiment of a high-pressure metal-vapor discharge lamp lighting apparatus of the present invention.

In the present embodiment, there is provided the high-pressure metal-vapor discharge lamp lighting apparatus usable in a headlight device for an automobile to light a mercury-free lamp. In FIG. 1, DC denotes a DC power supply, SW1 is a power switch, OC is a lighting circuit, CC is a control circuit, IG is an igniter, and HPL is a high-pressure metal-vapor discharge lamp. Each of constituting elements will hereinafter be described.

The DC power supply DC includes a battery having a DC voltage of 12 V.

The power switch SW1 is series-connected between the DC power supply DC and the lighting circuit OC described later to turn on/off the high-pressure discharge lamp HDL.

<Lighting Circuit OC>

The lighting circuit OC includes a switching regulator DC/DC and an inverter DC/AC.

(Switching Regulator DC/DC)

The switching regulator DC/DC mainly includes an output transformer T, a switching device Q1, a gate drive signal generation circuit GDCS, a diode D1, and a smooth capacitor C2. It is to be noted that an input end of the switching regulator DC/DC is connected in parallel with an electrolytic capacitor C1.

A primary winding wp of the output transformer T and the switching device Q1 are series-connected between opposite ends of the electrolytic capacitor C1. The switching device Q1 includes a MOSFET. It is to be noted that a resistor R1 inserted in series with the switching device Q1 is disposed for switching current detection. The gate drive signal generation circuit GDGS generates a gate drive signal to apply the signal between gate and source of the switching device Q1. Moreover, the gate drive signal can be PWM-controlled in response to a control signal inputted from the outside of the circuit. The diode D1 and smooth capacitor C2 are connected in series with the opposite ends of a secondary winding ws of the output transformer T.

Moreover, a boosted, controlled, and smoothed DC output voltage of the switching regulator DC/DC is obtained across the opposite ends of the smooth capacitor C2.

(Inverter DC/AC)

The inverter DC/AC includes a full bridge type inverter, and includes four switching devices Q2 to Q5, gate drive circuits GDC1 to GDC4, a rectangular wave oscillation circuit OSC, a switching device SW2, an inverting circuit N, and a non-inverting circuit Y. Each of the four switching devices Q2 to Q5 includes a MOSFET, and is connected to constitute a bridge circuit. Moreover, the input end of the bridge circuit is connected between DC output ends of the switching regulator DC/DC. The gate drive circuits GDC1 to GDC4 form a gate drive signal in synchronization with an output signal or DC potential of the rectangular wave oscillation circuit OSC described later via the inverting circuit N or the non-inverting circuit Y, and supply the gate drive signal between the gate and source of each of the corresponding switching devices Q2 to Q5 to turn on these devices. The rectangular wave oscillation circuit OSC oscillates the output signal having a rectangular wave at a frequency of 100 Hz to 2 kHz. The switching device SW2 selectively connects the output signal and DC potential of the rectangular wave oscillation circuit OSC to the gate drive circuits GDC1 and GDC3 via the inverting circuit N, and also connects them to the gate drive circuits GDC2 and GDC4 via the non-inverting circuit Y.

Moreover, when the outputs of the rectangular wave oscillation circuit OSC are applied to the gate drive circuits GDC1 to GDC4 via the switching device SW2 and the inverting circuit N or the non-inverting circuit Y, Q2 and Q5, and Q3 and Q4 among four switching devices are alternately switched to perform an inverter operation, and an AC output voltage is obtained from an output end of the bridge circuit comprising these devices.

Moreover, when the DC potentials are applied to the gate drive signal generation circuits GDC1 to GDC4 via the switching device SW2 and the inverting circuit N or the non-inverting circuit Y, Q2 and Q5 turn on and Q3 and Q4 turn off among four switching devices, so that the DC output voltage is obtained via the output end of the bridge circuit. In short, the lighting circuit OC is capable of direct-current or alternating-current lighting the high-pressure discharge lamp HPL described later, when either one of the direct-current and alternating-current outputs is selected.

<Control Circuit CC>

The control circuit CC includes a lamp voltage detection circuit LVD, a lamp current detection circuit LCD, a lighting detection circuit LD, a lighting time timer OT, a lights-out time timer LOT, a target lamp power calculation circuit LWG, an actual lamp power calculation circuit LWO, a lamp voltage change ratio detection circuit VLRD, a lamp power change ratio correction circuit LWVC, and a lamp power adjustment circuit LPR.

(Lamp Voltage Detection Circuit LVD)

The lamp voltage detection circuit LVD includes a series circuit of a pair of resistors R2, R3 connected between the opposite ends of the smooth capacitor C2 via which the DC output voltage of the switching regulator DC/DC is obtained, and a division voltage is obtained in proportion to the lamp voltage of the high-pressure discharge lamp HPL on the opposite ends of the resistor R.

(Lamp Current Detection Circuit LCD)

The lamp current detection circuit LCD includes a resistor R4 inserted in series between the DC output of the switching regulator DC/DC and the DC input end of the inverter DC/AC, and a voltage drop of the resistor R4 is proportional to the lamp current.

(Lighting Detection Circuit LD)

The lighting detection circuit LD operates in response to the detection output of the lamp voltage detection circuit LVD. That is, for the high-pressure discharge lamp HPL, when the discharge starts, the voltage appearing between electrodes of the lamp is a lamp voltage apparently lower than a non-load output voltage that has appeared before.

Then, the lighting detection circuit LD monitors the detection output of the lamp voltage detection circuit LVD, and is capable of detecting that the high-pressure discharge lamp HPL has been lit, for example, with the rapid decrease of the detection output.

(Lighting Time Timer OT)

The lighting time timer OT obtains the output of the lighting detection circuit LD to start a timer operation, and measures the lighting period of time of the high-pressure discharge lamp HPL. Moreover, the timer output is sent to a target lamp power setting circuit TLP and switching means SW2 described later.

(Lights-out Time Timer LOT)

The lights-out time timer LOT starts the timer operation at the time of extinction of the output of the lighting detection circuit LD, and measures the lights-out period of time of the high-pressure discharge lamp HPL. Moreover, the timer sends the timer output to the lighting time timer OT, and changes an initial value of the lighting time timer OT in accordance with the lights-out period of time.

(Target Lamp Power Calculation Circuit LWG)

The target lamp power calculation circuit LWG is disposed to obtain a target lamp power. The target lamp power calculation circuit LWG also has data of the target lamp voltage, and inputs the data of the target lamp voltage into the lamp power adjustment circuit LPR via the lamp power change ratio correction circuit LWVC described later.

Figure 2:
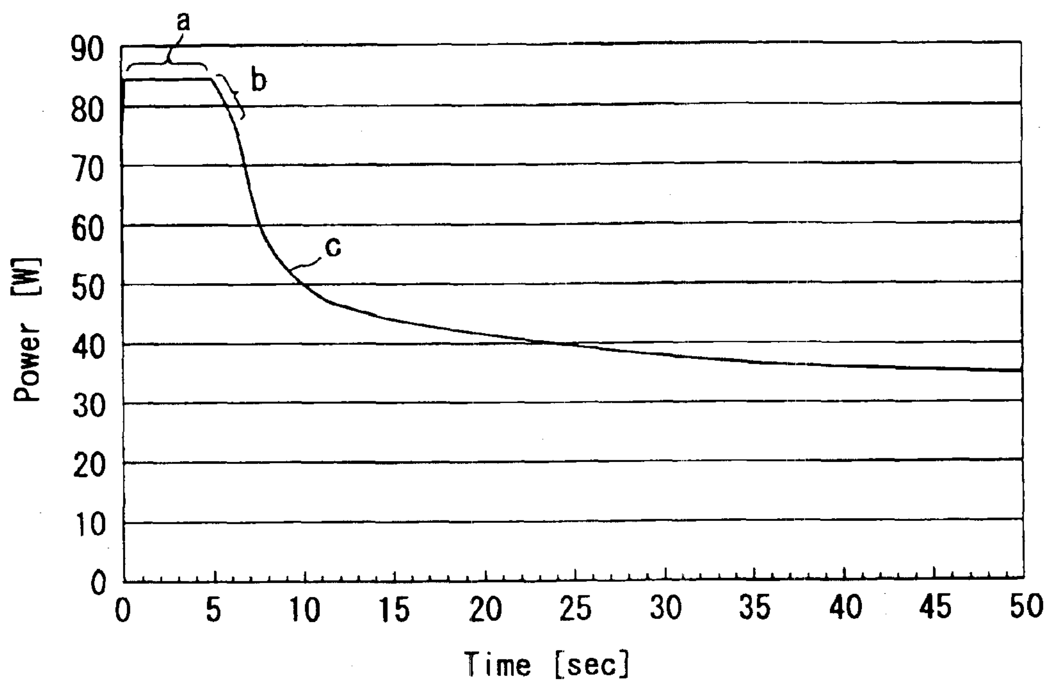
FIG. 2 is a graph showing a change of a target lamp power with time in the embodiment of FIG. 1.

Furthermore, as shown in FIG. 2, the target lamp power calculation circuit LWG is provided with target lamp power characteristics from the starting at about a room temperature beforehand. It is to be noted that the target lamp power characteristics are not shown, but are set to change in a fine stepwise manner. The target lamp power characteristics include a target lamp power "a" in a first time slot, a target lamp power "b" in a time slot in which the metal halide rapidly evaporates, and a target lamp power "c" in a second time slot.

The target lamp power "a" defines a maximum power to be supplied in the first time slot of five seconds from the lighting start. Moreover, the maximum power is set to be constant at 85 W which is 2.5 times a rated lamp power of the high-pressure discharge lamp HPL, which is 35 W.

The target lamp power "b" defines the lamp power to be supplied in the time slot which indicates 1.5 seconds after the period of the target lamp power "a" and in which the metal halide rapidly evaporates. Moreover, the lamp power linearly drops at an attenuation ratio of 4 W/second, and drops down to 79 W in the end of the target lamp power "b".

The target lamp power "c" defines the lamp power to be supplied in a second time slot of 44 seconds after the period of the target lamp power "b". Moreover, the lamp power successively drops down to a rated lamp power of 35 W in the end of the target lamp power "c". Therefore, the target lamp power "c" in the second time slot defines a first reduction ratio described later. The first reduction ratio is first large and successively decreases. Therefore, when the high-pressure metal-vapor discharge lamp has standard rising characteristics of the quantity of light, the quantity of light is set so as to smoothly increase at the rising start of the quantity of light after the lighting start in such a manner that the lighting is stabilized in 50 seconds.

(Actual Lamp Power Calculation Circuit LWO)

The actual lamp power calculation circuit LWO is disposed to calculate the actual lamp power based on the detection outputs of the lamp voltage detection circuit LVD and lamp current detection circuit LCD. Moreover, the output of the actual lamp power calculation circuit LWO is inputted into one input end of the lamp power adjustment circuit LPR described later.

(Lamp Voltage Change Ratio Detection Circuit VLRD)

The lamp voltage change ratio detection circuit VLRD compares/calculates the detection output of the lamp voltage detection circuit LVD with the target lamp power obtained from the target lamp power calculation circuit LWG to detect the change ratio of the lamp voltage. Moreover, the voltage corresponding to the obtained change ratio of the lamp voltage is controlled/inputted into the lamp power change ratio correction circuit LWVC described later.

(Lamp Power Change Ratio Correction Circuit LWVC)

The lamp power change ratio correction circuit LWVC includes a time constant circuit including an electronic volume. The time constant circuit includes a series circuit of an electronic volume EVR and electrolytic capacitor C. The voltage corresponding to the target lamp power outputted from the target lamp power calculation means LWG is applied as an operation power between the opposite ends of the series circuit. A control terminal of the electronic volume EVR is connected to the output end of the lamp voltage change ratio detection circuit VLRD. Moreover, the input of the electronic volume EVR is controlled in accordance with the change ratio of the lamp voltage. It is to be noted that a relation between a control amount of the electronic volume EVR and the change ratio of the lamp voltage is constituted so as to perform a predetermined correlation operation beforehand or so as to be changeable every operation as desired.

(Lamp Power Adjustment Circuit LPR)

The lamp power adjustment circuit LPR includes an operation amplifier DFA. Moreover, the output voltage of the lamp power change ratio correction circuit LWVC is inputted in a reverse input end which is the other input end of the circuit. As described above, the voltage corresponding to the actual lamp power is inputted into the non-load output voltage which is one input end as described above. Furthermore, the difference between the corrected target lamp power and the actual lamp power is outputted via the output end. The output end is connected to the control input end of the gate drive signal generation circuit GDCS of the switching regulator DC/DC.

Moreover, the output of the actual lamp power obtained from the actual lamp power calculation circuit LWO and the output of the target lamp power calculation circuit LWG corrected by the lamp power change ratio correction circuit LWVC are inputted into the respective input ends of the operation amplifier DFA of the lamp power adjustment circuit LPR. The output corresponding to the difference is controlled/inputted into a PWM control terminal of the gate drive signal generation circuit GDCS of the switching regulator DC/DC. As a result, the DC output voltage of the switching regulator DC/DC is PWM-controlled, and the actual lamp power changes to approach the corrected target lamp power.

<Igniter IG>

The igniter IG has a constitution in common use, and starts the operation, when the power switch SW1 is turned on, to generate a required starting pulse. The generated starting pulse is applied to the high-pressure discharge lamp HPL described later.

<High-Pressure Discharge Lamp HPL>

Figure 3:
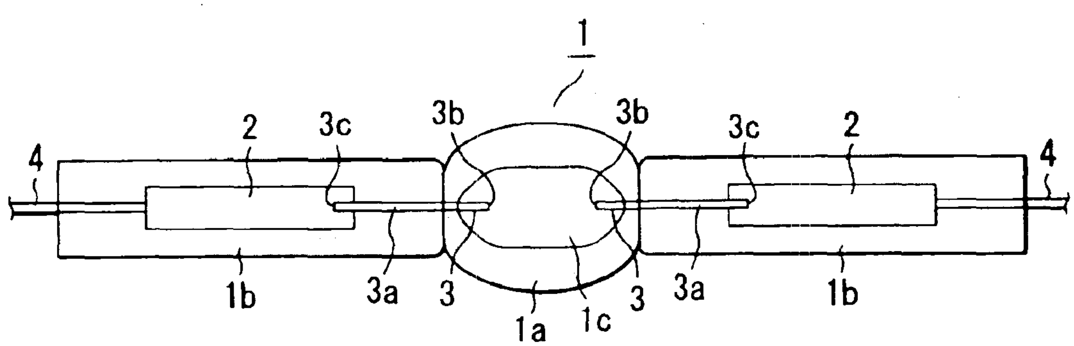
FIG. 3 is a vertical sectional view of a high-pressure metal-vapor discharge lamp in the embodiment of FIG. 1.

The high-pressure discharge lamp HPL includes a structure shown in FIG. 3. That is, the high-pressure discharge lamp HPL includes an airtight container 1, a discharge medium, a sealed metal foil 2, one pair of electrodes 3, 3, and an external lead wire 4.

The airtight container 1 includes a surrounding portion 1*a*, and one pair of seal portions 1*b*, 1*b*. The surrounding portion 1*a* is molded in a hollow spindle shape, and an elongated columnar discharge space 1*c* is formed in an axial direction in the surrounding portion. One pair of seal portions 1*b*, 1*b* are formed integrally with the opposite ends of the surrounding portion 1*a*.

The sealed metal foil 2 is formed of a ribbon-like molybdenum foil, and is buried in one pair of seal portions 1*b*, 1*b* of the airtight container 1 in an airtight manner by a reduced pressure seal process.

For one pair of electrodes 3, 3, a shaft portion 3*a* has a straight rod shape, and a tip 3*b* constituting a start point of an arc forms a hemispherical curved surface having a radius which is ½ or less of the diameter of the shaft portion 3*a* over the tip of the electrode shaft portion. Moreover, a base end 3*c* is buried in and supported by one pair of seal portions 1*b*, 1*b* of the airtight container 1. On a tip side, the electrodes protrude into the discharge space 1*c* from the opposite ends of the surrounding portion 1*a* of the airtight container 1, and the electrodes 3, 3 face each other at a distance of 5 mm or less. Moreover, the base end of each of the pair of electrodes 3, 3 is connected to one end of the sealed metal foil 2.

The tip of the external lead wire 4 is weld-bonded to the other end of the sealed metal foil 2, and is derived to the outside from the seal portion 1*b* of the airtight container 1.

The luminescent metal and the metal halide and xenon for forming the lamp voltage are charged as the discharge mediums in the airtight container 1.

EXAMPLES

Airtight container 1: made of quartz glass and having an outer diameter of 6 mm, inner diameter of 2.7 mm, and a surrounding portion length of 7.0 mm Electrode 3: made of tungsten, a diameter of the shaft portion is 0.35 mm, a radius of a curved surface of a tip constituting the start point of the arc is 0.175 mm, a distance between electrodes 3, 3 is 4.2 mm, and a protruding length is 1.4 mm Discharge Medium Metal halide: $ScI_3$—NaI—$ZnI_2$=0.4 mg Xenon: 10 atmospheres at 25° C.

Electric characteristics: a lamp power of 35 W, lamp voltage of 42V (either at the stable time)

<Circuit Operation>

(Circuit Operation at Low-temperature Starting Time)

Since a sufficient time elapses after the previous lights-out time at the low-temperature starting time at room temperature, the high-pressure metal-vapor discharge lamp HPL is cooled at, at least, approximately room temperature. In this state, when the power switch SW1 is turned on, the switching regulator DC/DC of the lighting circuit OC operates, and the DC voltage controlled as required is applied between the input ends of the inverter DC/AC. Since the switching device SW2 is switched downwards in FIG. 1, the switching devices Q2, Q5 of the inverter DC/AC turn on, and Q3, Q4 turn off. Therefore, the inverter DC/AC functions as a simple DC switch circuit, and applies the DC voltages to the igniter IG and high-pressure metal-vapor discharge lamp HPL. Moreover, the igniter IG generates a high-pressure pulse voltage and applies the voltage to the high-pressure metal-vapor discharge lamp HPL. As a result, the high-pressure metal-vapor discharge lamp HPL starts to light under the DC voltage. That is, the direct-current lighting is performed. It is to be noted that when the high-pressure metal-vapor discharge lamp HPL once lights, the voltage across the input ends of the igniter IG drops down to the lamp voltage, and therefore a high-voltage pulse generation operation stops.

When the high-pressure discharge lamp HPL lights, the lighting detection circuit LD detects this, the lighting time timer OT starts the timer operation, and further the lights-out time timer LOT ends the timer operation to change the initial value of the lighting time timer OT in accordance with the lights-out time. It is to be noted that the initial value at the low-temperature starting time is set to be a lighting time of 0 second.

Next, when the lighting time timer OT performs the timer operation for a predetermined time, the lighting time timer OT sends the control input into the switching device SW2, and the switching device SW2 switches upwards in FIG. 1. Accordingly, the output signal of the rectangular wave oscillation circuit OSC is applied to the gate drive signal generation circuits GDC1 to GDC4 of the inverter DC/AC via the switching device SW2, inverter circuit N, and non-inverter circuit Y. Accordingly, in response to the turning on/off of the output signal of the rectangular wave oscillation circuit OSC, the switching devices Q2, Q5, and Q3, Q4 are driven by gate drive signals to alternately turn on/off, and therefore the inverter operation starts. As a result, the operation mode of the high-pressure metal-vapor discharge lamp HPL switches to the alternating-current lighting.

On the other hand, the lighting time timer OT integrates the lighting time while sending the integrated value, that is, the lighting time to the target lamp power calculation circuit LWG every time. The target lamp power calculation circuit LWG receives the lighting time to output the target lamp power in accordance with the time and to output the target lamp voltage. Moreover, the target lamp power is applied as the operation power to the reduction ratio correction circuit LWVC of the lamp power. The target lamp voltage is inputted into the lamp voltage change ratio detection circuit VLRD described later.

Since the detection output of the lamp voltage detection circuit LVD and the target lamp voltage from the target lamp power calculation circuit LWG are inputted into the lamp voltage change ratio detection circuit VLRD, the change ratio of the lamp voltage is outputted. Moreover, the change ratio of the lamp voltage is sent as the control input into the variable reduction ratio correction circuit LWVC. As a result, the target lamp power outputted from the reduction ratio correction circuit LWVC is corrected in conformity to the rising characteristics of the quantity of light of the high-pressure metal-vapor discharge lamp HPL, and is inputted into the other input end of the lamp power adjustment circuit LPR.

On the other hand, since the detection outputs of the lamp voltage detection circuit LVD and lamp current detection circuit LCD are inputted into the actual lamp power calculation circuit LWO, both the outputs are multiplied to calculate the actual lamp power, and the power is inputted into one input end of the lamp power adjustment circuit LPR.

The corrected target lamp power and the actual lamp power are respectively inputted into the input ends of the lamp power adjustment circuit LPR, and a difference between the powers is outputted. Moreover, the difference is further inputted into the control input end of the gate drive signal generation circuit GDCS of the switching regulator DC/DC.

Figure 4A:
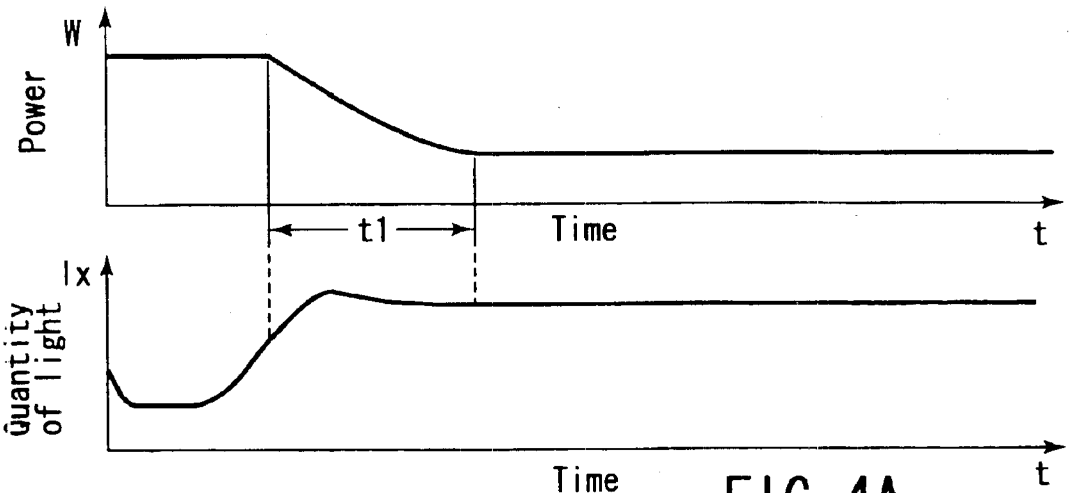
FIG. 4A is a graph showing changes of a supplied lamp power and quantity of light with respect to a lighting time in a case where the rising of the quantity of light of the high-pressure metal-vapor discharge lamp for use in the embodiment of FIG. 1 is intermediate.
Figure 4B:
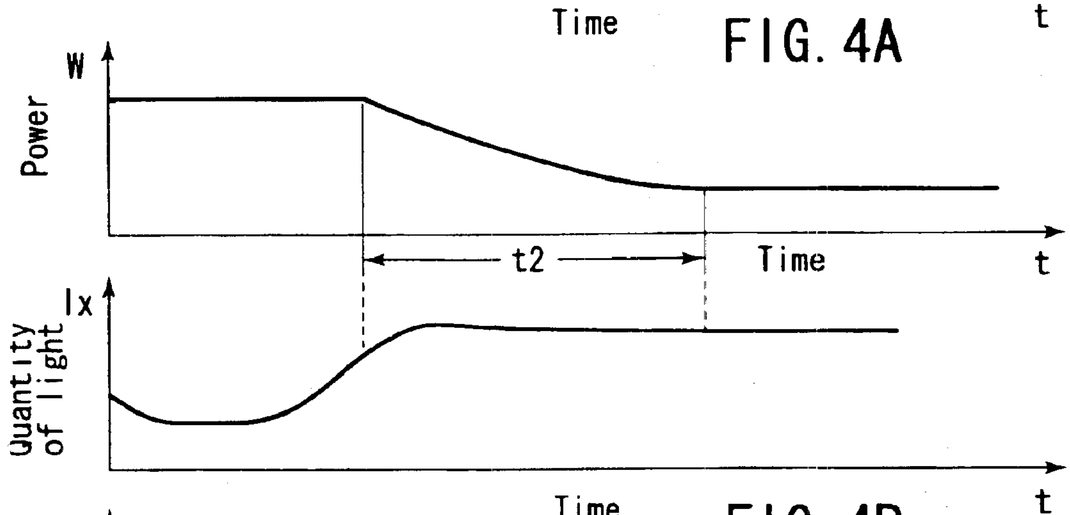
FIG. 4B is a graph showing the changes of the supplied lamp power and the quantity of light with respect to the lighting time in a case where the rising of the quantity of light of the high-pressure metal-vapor discharge lamp for use in the embodiment of FIG. 1 is late.
Figure 4C:
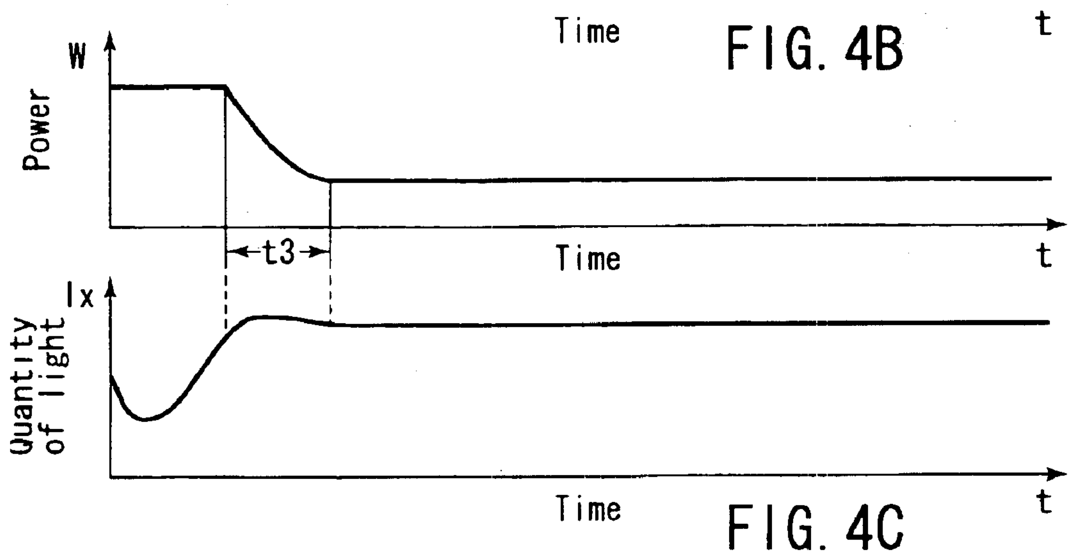
FIG. 4C is a graph showing the changes of the supplied lamp power and the quantity of light with respect to the lighting time in a case where the rising of the quantity of light of the high-pressure metal-vapor discharge lamp for use in the embodiment of FIG. 1 is early.

When the difference is inputted into the control input end of the gate drive signal generation circuit GDCS of the switching regulator DC/DC, the switching regulator DC/DC is PWM-controlled, and the direct-current output changes in a direction in which the difference becomes to 0. As a result, the target lamp power corrected so as to conform to the rising characteristics of the quantity of light is supplied to the high-pressure metal-vapor discharge lamp HPL. Therefore, as shown in FIGS. 4A, 4B, 4C, the high-pressure discharge lamp HPL is controlled to light as desired under the lamp power which changes along the target lamp power corrected to conform to the rising characteristics of the quantity of light possessed by the high-pressure metal-vapor discharge lamp HPL which lights with the elapse of the lighting time. As a result, the quantity of light of the high-pressure metal-vapor discharge lamp HPL rises smoothly and rapidly.

Next, a relation between the supplied lamp power (the ordinate denoted with W) corrected to conform to the rising characteristics of the quantity of light of the high-pressure metal-vapor discharge lamp HPL by the present embodiment and the rising of the quantity of light (the ordinate denoted with lx) will be described with reference to FIGS. 4A to 4C. FIG. 4A shows the high-pressure metal-vapor discharge lamp having the intermediate rising characteristics of the quantity of light, FIG. 4B shows the high-pressure metal-vapor discharge lamp having the late rising characteristics of the quantity of light, and FIG. 4C shows the high-pressure metal-vapor discharge lamp having the early rising characteristics of the quantity of light.

The target lamp power set in accordance with the high-pressure metal-vapor discharge lamp HPL whose quantity of light rises at an intermediate rate as shown in FIG. 4A will hereinafter be described. That is, in FIG. 4A, the actual lamp voltage of the high-pressure metal-vapor discharge lamp HPL changes so as to be substantially equal to the target lamp voltage. Therefore, the output of the lamp voltage change ratio detection circuit VLRD is reduced. Accordingly, since the control input of the reduction ratio correction circuit LWVC is reduced, a resistance value of the time constant circuit is maintained to be substantially intermediate. Moreover, the target lamp power is not corrected at all, or is corrected to a slight degree. It is to be noted that the reduction time of the lamp power indicating from the reduction start of the lamp power until the rated lamp power is reached has an intermediate value at t1.

When the quantity of light of the high-pressure metal-vapor discharge lamp HPL rises late as shown in FIG. 4B, the actual lamp voltage becomes smaller than the target lamp voltage, and accordingly the output is generated from the lamp voltage change ratio detection circuit VLRD. Therefore, the resistance value of the electronic volume of the reduction ratio correction circuit LWVC increases, and the time constant increases. As a result, the supplied power increases slowly with respect to the high-pressure metal-vapor discharge lamp HPL. It is to be noted that the reduction time of the lamp power is t2, which is a relatively large value.

When the quantity of light of the high-pressure metal-vapor discharge lamp HPL rises very rapidly as shown in FIG. 4C, the actual lamp voltage becomes larger than the target lamp voltage, and accordingly the output is generated from the lamp voltage change ratio detection circuit VLRD. Therefore, the resistance value of the electronic volume of the reduction ratio correction circuit LWVC decreases, and the time constant decreases. As a result, the supplied power increases early with respect to the high-pressure metal-vapor discharge lamp HPL. It is to be noted that the reduction time of the lamp power is t3, which is a relatively small value.

In any case of FIGS. 4A to 4C, as a result of the reduction of the lamp power in conformity to the rising characteristics of the quantity of light of the high-pressure metal-vapor discharge lamp HPL, the quantity of light rises smoothly and early in its own manner.

Figure 5:
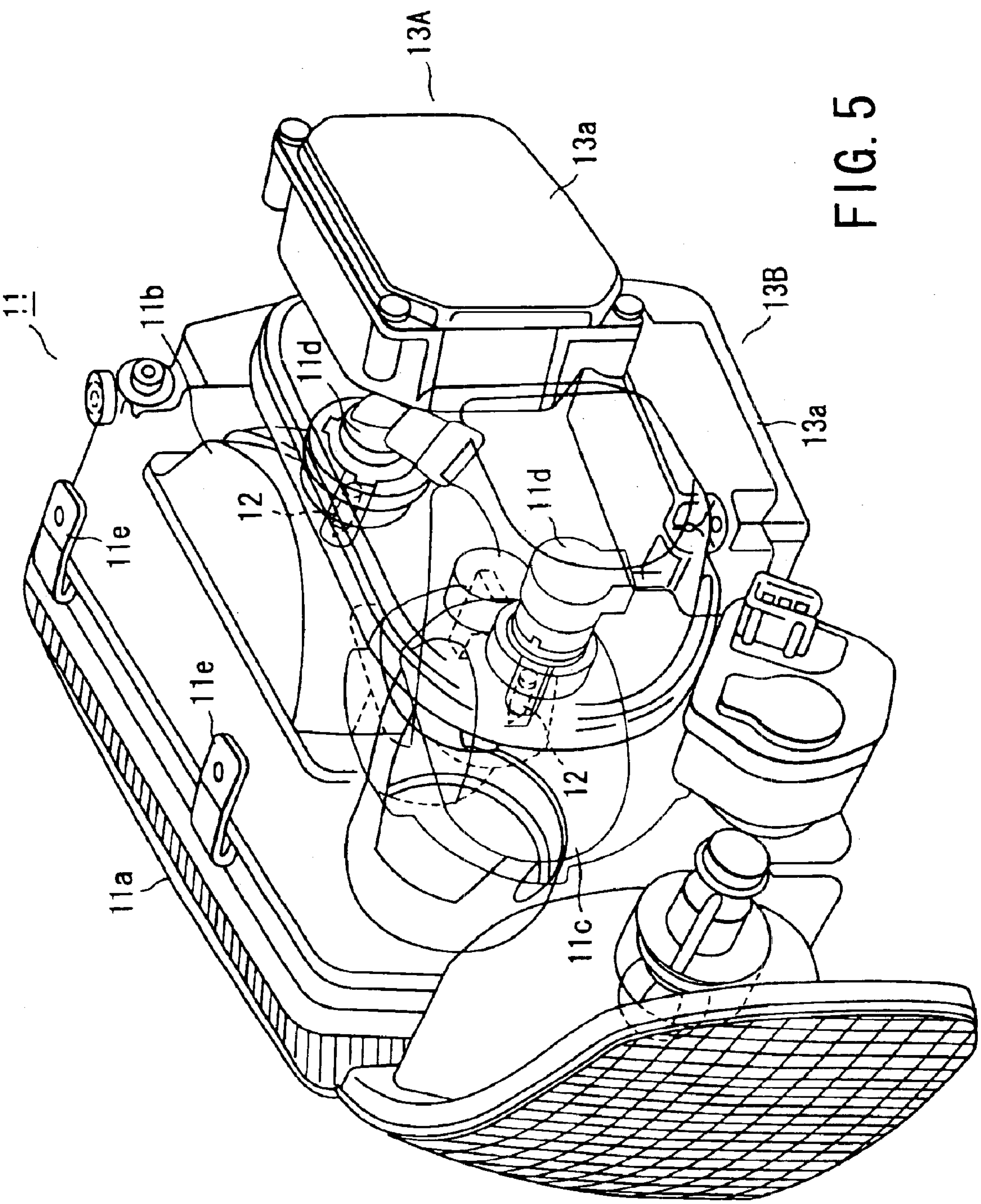
FIG. 5 is a rear side perspective view showing the whole constitution of the embodiment in which the present invention is applied to a headlight device for a vehicle.
Figure 6:
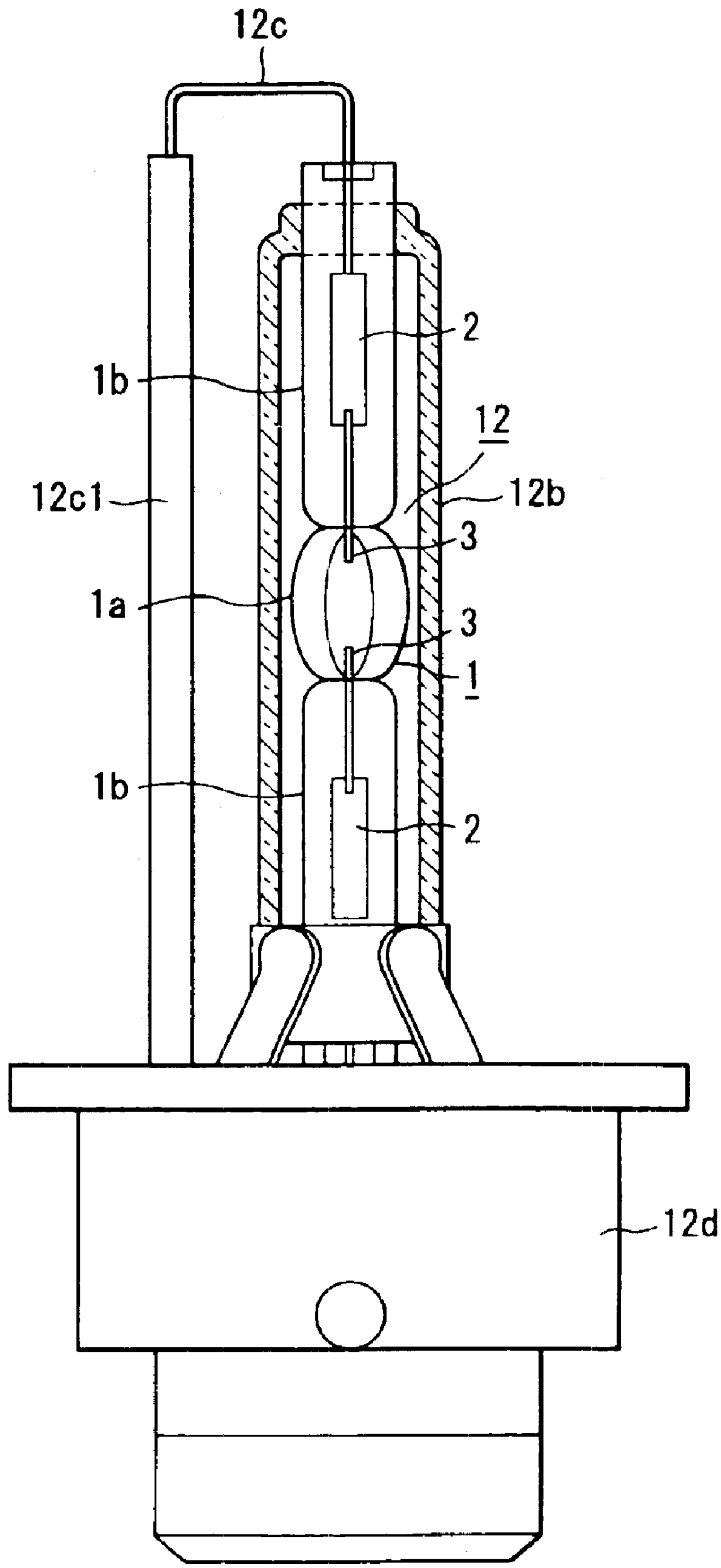
FIG. 6 is a front view showing the high-pressure metal-vapor discharge lamp for use as a headlight for the vehicle of the embodiment shown in FIG. 5.

FIGS. 5 and 6 show a headlight device for an automobile as another embodiment of the present invention, FIG. 5 is a rear side perspective view, and FIG. 6 is a front view showing the high-pressure metal-vapor discharge lamp. In the respective views, reference numeral 11 denotes a headlight device main body for the vehicle, 12 denotes a high-pressure metal-vapor discharge lamp, and 13A, 13B denote high-pressure discharge lamp lighting apparatuses.

The headlight device main body 11 for the vehicle includes a front surface transmission panel or a front surface lens 11*a*, reflectors 11*b*, 11*c*, lamp sockets 11*d*, attaching portions 11*e* and the like. The front surface lens 11*a* has a shape adapted to the outer surface of the automobile, and includes required optical member such as a prism. The reflectors 11*b*, 11*c* are disposed for the respective high-pressure metal-vapor discharge lamps 12 so as to obtain required light distribution characteristics. Each lamp socket 11*d* is connected to the output end of the high-pressure metal-vapor discharge lamp lighting apparatus, and is connected to a cap 12*d* of the high-pressure metal-vapor discharge lamp 12. The attaching portions 11*e* are members for attaching the headlight device main body 11 for the vehicle to a predetermined position of the vehicle such as the automobile.

The high-pressure metal-vapor discharge lamp 12 includes a luminous tube 1*b*, outer tube 12*b*, lead wire 12*c*, and cap 12*d*. The luminous tube 1*b* includes the structure shown in FIG. 3, and one end thereof is supported by the cap 12*d*. The outer tube 12*b* surrounds the outside of the luminous tube 1*b*. The lead wire 12*c* is derived from the other end of the luminous tube 1*b*, and is connected to the cap 12*d* along the luminous tube 1*b*. It is to be noted that 12*c*1 denotes an insulating tube. The rear surface of the cap 12*d* is attached to the reflectors 11*b*, 11*c* of the headlight device main body 11 for the vehicle and is connected to the lamp socket 11*d*. Moreover, two high-pressure metal-vapor discharge lamps 12 are attached to the headlight device main body 11 for the vehicle to constitute the four-lamp type headlight device for the vehicle. A light emission portion of each high-pressure metal-vapor discharge lamp 12 is positioned substantially in a focal point of the reflectors 11*b*, 11*c* of the headlight device main body 11 for the vehicle.

The high-pressure discharge lamp lighting apparatuses 13A, 13B include remaining parts except the high-pressure metal-vapor discharge lamps. Each of the apparatuses includes the circuit constitution shown in FIG. 1 and is housed in a metal container 13*a* and urges and lights the high-pressure metal-vapor discharge lamp 12.

Next, another embodiment of the present invention will be described in detail with reference to FIGS. 7 and 8. In the present embodiment, the control circuit CC of the embodiment in FIG. 1 includes the microcomputer MC. The functions of the lighting detection circuit LD, lighting time timer OT, lights-out time timer LOT, target lamp power calculation circuit LWG, actual lamp power calculation circuit LWO, lamp voltage change ratio detection circuit VLRD, and lamp power change ratio correction circuit LWVC in the embodiment of FIG. 1 are realized by the microcomputer MC and the circuits of the FIG. 1 embodiment are shown by the function blocks in FIG. 7. Further in the microcomputer MC, a table memory is included in the memory M, and information stored in the memory M is used in realizing the actual lamp power calculation function LWO and lamp power change ratio correction function LWVC. This will be described later in detail.

Figure 7:
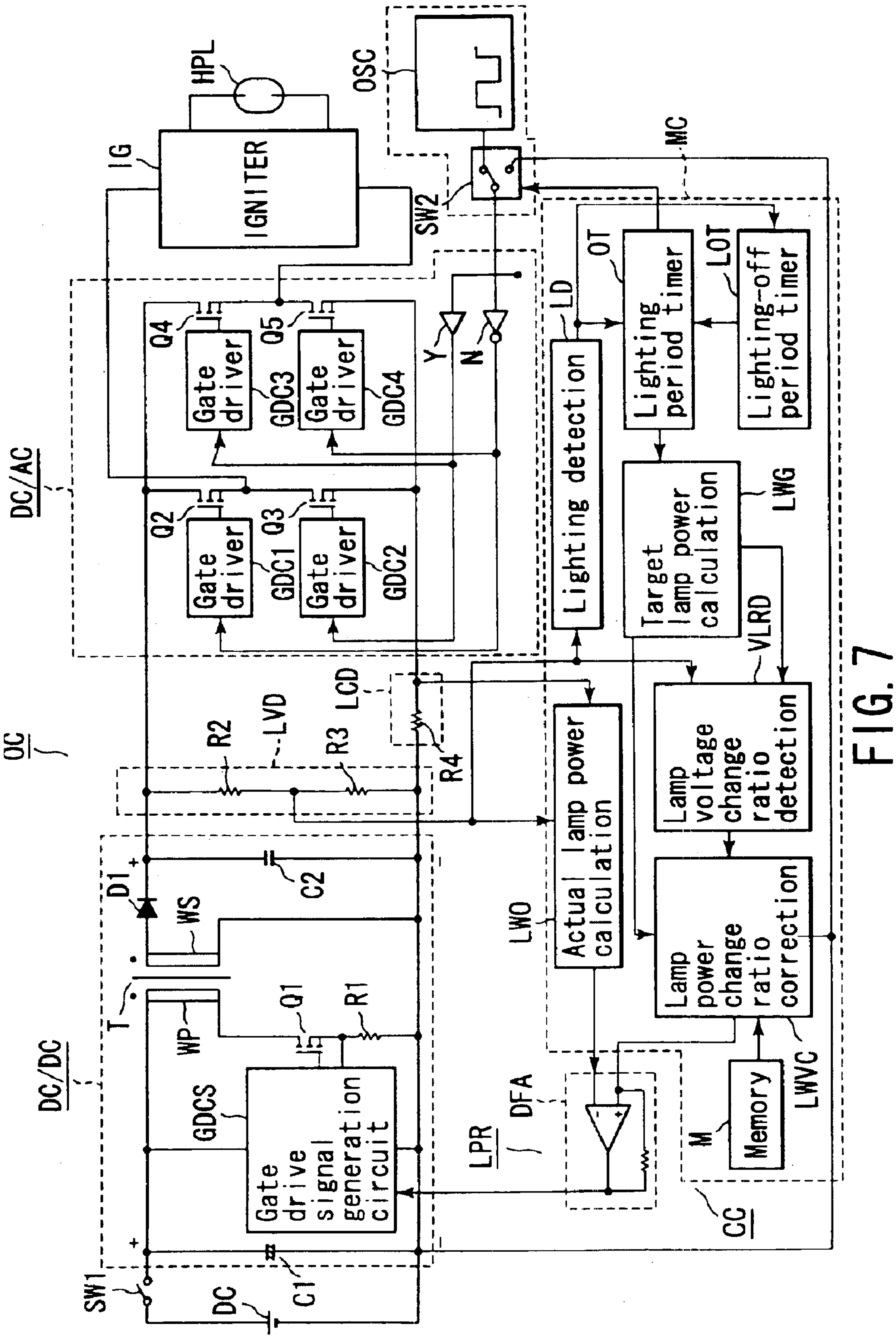
FIG. 7 is a block circuit diagram showing the constitution of the high-pressure metal-vapor discharge lamp lighting apparatus of another embodiment of the present invention in which a microcomputer is used.
Figure 8:
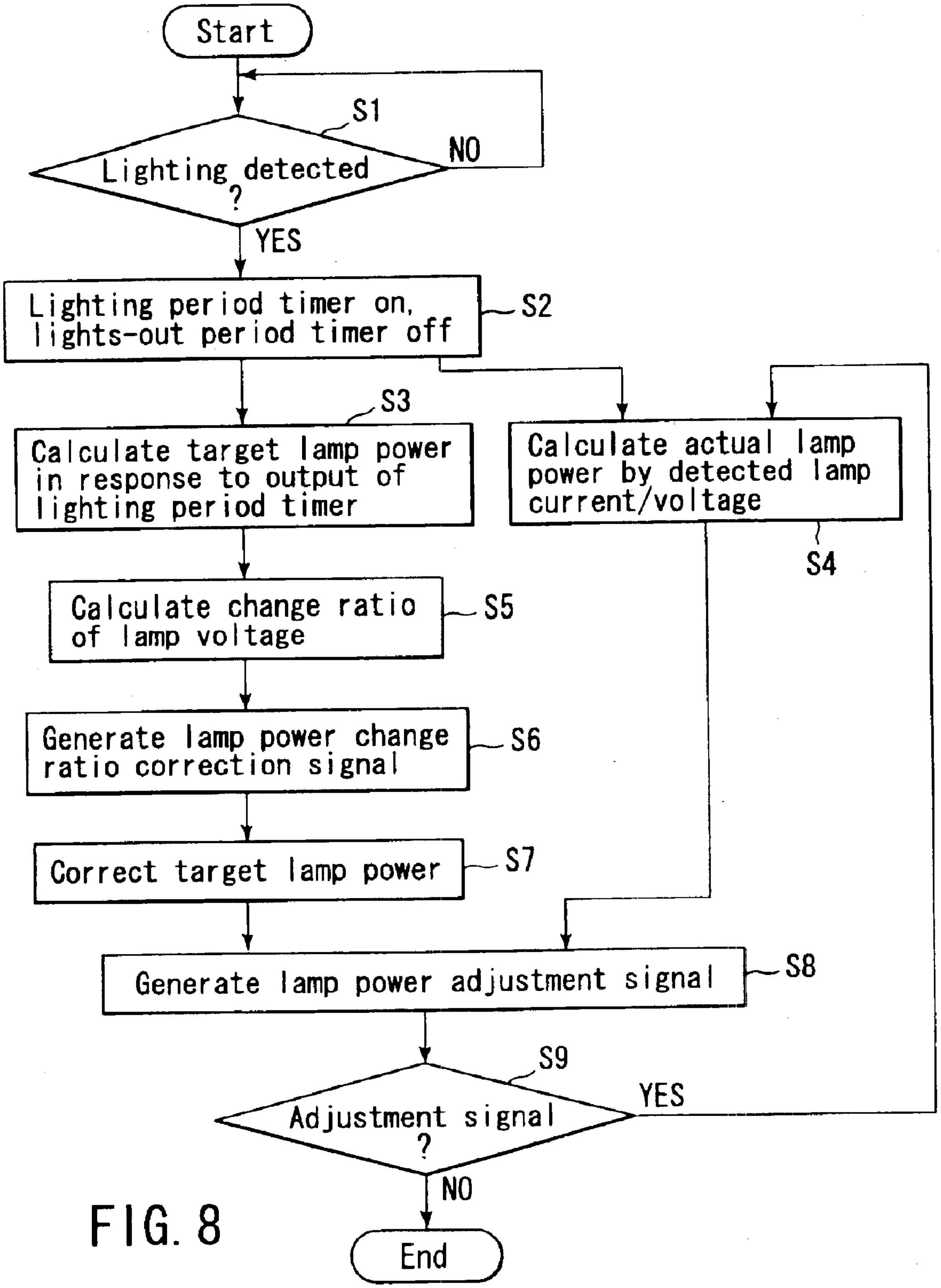
FIG. 8 is a flowchart showing an operation of the microcomputer of the embodiment of FIG. 7.
Figure 9A:
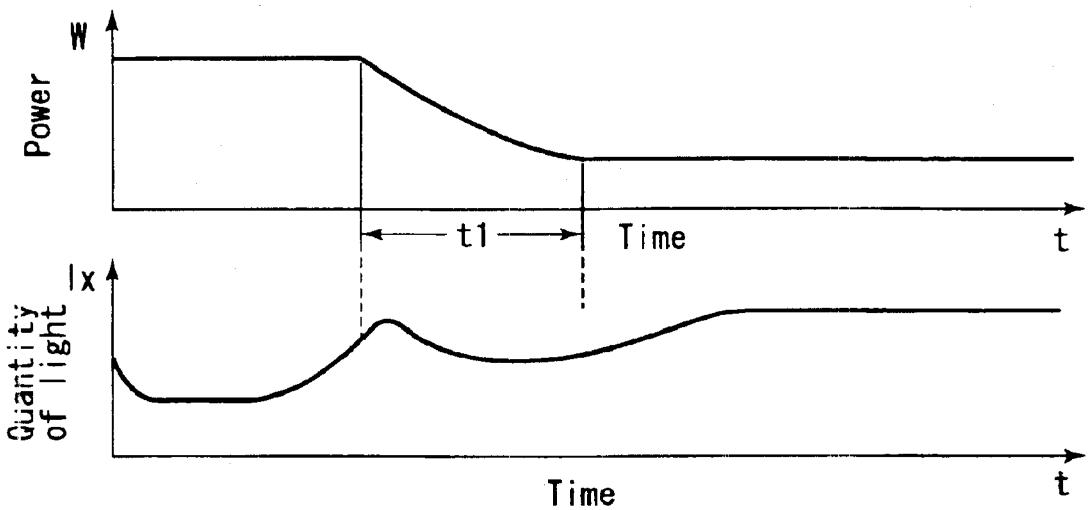
FIG. 9A is a graph showing the changes of the supplied lamp power and the quantity of light with respect to the lighting time in a conventional high-pressure metal-vapor discharge lamp in which the quantity of light rises late.
Figure 9B:
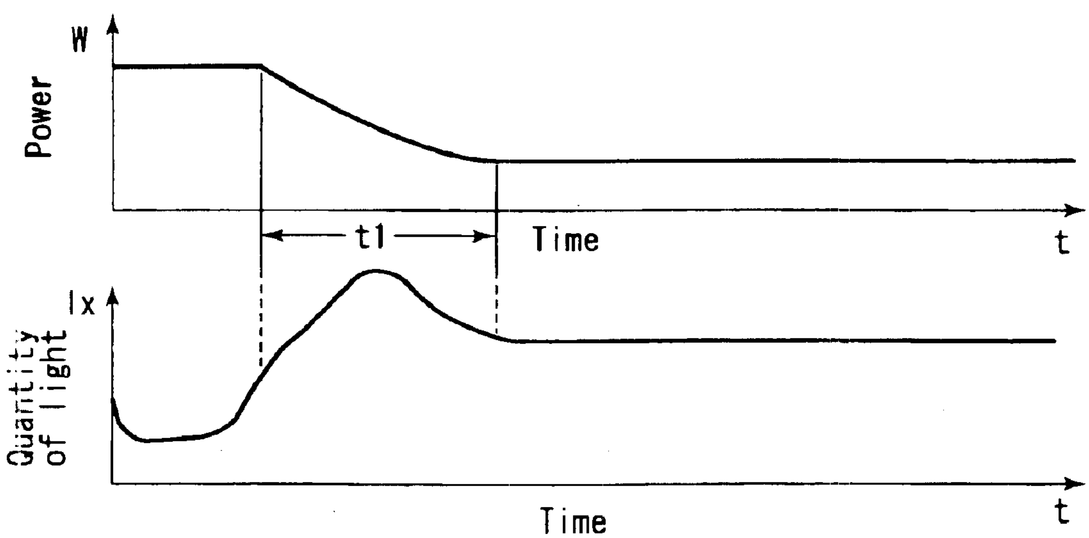
FIG. 9B is a graph showing the changes of the supplied lamp power and the quantity of light with respect to the lighting time in the conventional high-pressure metal-vapor discharge lamp in which over-emission of light occurs.

In the same manner as in the embodiment of FIG. 1, the detection outputs from the lamp voltage detection circuit LVD and lamp current detection circuit LCD are supplied into the microcomputer MC of FIG. 7. In the microcomputer MC, the detection output from the lamp voltage detection circuit LVD is used for detecting the lighting and the lamp voltage change ratio, and is also used for calculating the actual lamp power. The detection output from the lamp current detection circuit LCD is used for calculating the actual lamp power.

The operation of the microcomputer MC of the embodiment shown in FIG. 7 will hereinafter be described with reference to the flowchart of FIG. 8. When the power switch SW1 is turned on, the power is also supplied to the microcomputer MC, and the CPU in the microcomputer MC is started in accordance with the program stored in a program memory included in the memory M. In a first step S1, the voltage from the lamp voltage detection circuit LVD is monitored to check whether or not the high-pressure metal-vapor discharge lamp HPL, the mercury-free lamp herein, lights.

When it is detected that the high-pressure metal-vapor discharge lamp HPL lights, the step advances to the next step S2 to stop the lights-out time timer LOT in the microcomputer MC. Moreover, a content of the lights-out time timer LOT at this time is transferred as the initial value to the lighting time timer OT, and the lighting time timer OT is started from this initial value. In this case, when the temperature of the high-pressure metal-vapor discharge lamp HPL is approximately room temperature, the lamp HPL is started at the low temperature as described above, the changeover switch SW2 is switched downwards by the output of the lighting time timer OT, and the lamp HPL is direct-current lit. Therefore, the initial value of the lighting time timer OT at this time is zero second. When the lighting time timer OT operates for a predetermined time, the changeover switch SW2 is switched upwards by the output of the lighting time timer OT, and the lamp HPL is alternating-current lit by the output of the rectangular wave oscillation circuit OSC.

When the lighting time timer OT starts, the operation shifts to the next steps S3 and S4. In the step S3, the target lamp power calculation function LWG is executed in response to the output of the lighting time timer OT.

When a long period of time elapses after turning off the lamp HPL, the temperature of the lamp HPL drops at the room temperature. Therefore, for the power to be supplied to the lamp HPL, that is, the target lamp power, the maximum power is supplied in an initial stage, for example, as shown in any of FIGS. 4A to 4C.

On the other hand, when the elapsed time is short, the temperature of the lamp HPL does not drop at room temperature yet, a large starting power does not have to be applied to the lamp HPL, and a power close to the rated lamp power may only be applied.

In the embodiment using the microcomputer MC, the relation between the content of the lights-out time timer LOT at the lighting and the target lamp power to be supplied is stored beforehand in the table memory in the memory M, and target lamp power data and target lamp voltage data are read from this table based on the content of the lighting time timer OT, and are obtained as calculation outputs.

Moreover, in the step S4, the detection outputs from the current, voltage detection circuits LVD, LCD are used to execute the actual lamp power calculation function LWO, and the actual lamp power is calculated.

The target lamp voltage data obtained by the execution of the target lamp power calculation function is used together with the output from the lamp voltage detection circuit LVD to execute the lamp voltage change ratio detection function VLRD in step S5. Here, the change ratio in the actual lamp voltage with the elapse of time is calculated on the basis of the target lamp voltage.

The data indicating the lamp voltage change ratio obtained in the step S5 is used together with the target lamp power data obtained by the execution of the target lamp power calculation function to execute the lamp power change ratio correction function LWVC in the next step S6. Here, the relation between the corrected target lamp power and the lamp voltage change ratio data is stored beforehand in the table in the memory M, and the change ratio (reduction ratio) correction data of the target lamp power is obtained from the table in the memory M based on the lamp voltage change ratio data.

It is to be noted that in the above description, the lamp voltage change ratio is calculated based on clock data outputted from the lighting time timer OT, for example, every second, and the lamp power is controlled based on this. However, instead of controlling the lamp power by the voltage change ratio every second, the lamp power may also be controlled by the lamp voltage change ratio divided into groups, for example, every second. In this case, at least two or more limited number of corrected lamp power reduction ratios are stored in and read out of the table in the memory M with respect to the grouped lamp voltage change ratios.

The target lamp power is corrected based on the corrected change ratio data in the next step S7, and the voltage value corresponding to the data is supplied to a non-inversion input terminal of the differential amplifier DFA.

Subsequently, in the step S8, the voltage value corresponding to the actual lamp power obtained by the execution of the actual lamp power calculation function LWO is supplied to an inversion input terminal of the differential amplifier DFA, and the voltage indicating the difference between the corrected target lamp power and the actual lamp power is inputted as the output of the differential amplifier DFA into the PWM control terminal of the gate drive signal generation circuit GDCS of the switching regulator DC/DC. As a result, when the actual lamp power is lower than the target lamp power, the pulse width supplied to the lamp HPL by the PWM control increases to increase the supply power. Conversely, when the actual lamp power is higher, the pulse width narrows, and the supply power is saved.

Subsequently, it is checked in step S9 whether or not the lamp power adjustment signal is outputted from the differential amplifier DFA. When the signal is outputted, the flow returns to the steps S3, S4 to repeat the subsequent control. On the other hand, when the lighting of the lamp HPL is brought into a stable state, the lamp power adjustment signal is not outputted from the differential amplifier DFA, the control by the microcomputer MC ends, and the lamp HPL continues to be lit by a rated power.

In accordance with one embodiment of the present invention, there is provided a high-pressure metal-vapor discharge lamp lighting apparatus comprising: a control circuit for allowing a lighting circuit to supply a lamp power larger than a rated lamp power to light a high-pressure metal-vapor discharge lamp, subsequently controlling the lighting circuit to successively reduce the lamp power in accordance with predetermined reduction ratio characteristics so that the lamp power settles at the rated lamp power, and allowing the reduction ratio characteristics to vary in accordance with fluctuations of rising characteristics of a quantity of light in the high-pressure metal-vapor discharge lamp. Accordingly, the reduction ratio of the lamp power can be varied in accordance with the fluctuations of the rising characteristics of the quantity of light of the high-pressure metal-vapor discharge lamp. Accordingly, the quantity of light until stable lighting from lighting start rises smoothly and comparatively early.

In accordance with another embodiment of the present invention, there is provided a high-pressure metal-vapor discharge lamp lighting apparatus comprising: a control circuit including a lamp voltage detection circuit for detecting a voltage corresponding to a lamp voltage of a high-pressure metal-vapor discharge lamp and constituted to supply a lamp power larger than a rated lamp power from a lighting circuit and light the high-pressure metal-vapor discharge lamp and to control the lighting circuit in such a manner that the lamp power is successively reduced in accordance with predetermined reduction ratio characteristics to settle at the rated lamp power and to vary the reduction ratio characteristics in accordance with the change ratio of a detection output of the lamp voltage detection circuit. Accordingly, the apparatus is capable of automatically handling the rising characteristics of the quantity of light possessed by the high-pressure metal-vapor discharge lamp, and is controlled in such a manner that the quantity of light until the stable lighting from the lighting start rises smoothly and comparatively early without any special operation.

In accordance with a still further embodiment of the present invention, there can be provided the high-pressure metal-vapor discharge lamp lighting apparatus in which additionally the control circuit includes a variable reduction ratio correction circuit for controlling the reduction ratio characteristics of the lamp power. Accordingly, a constitution for raising the quantity of light until the stable lighting from the lighting start smoothly and comparatively early is comparatively simple.

In accordance with a still further embodiment of the present invention, there is provided the high-pressure metal-vapor discharge lamp lighting apparatus in which additionally the high-pressure metal-vapor discharge lamp contains a second halide for forming a lamp voltage, and does not essentially contain mercury. Accordingly, with the use of the high-pressure metal-vapor discharge lamp whose rising characteristics of the quantity of light easily fluctuate but whose environmental load is small, the quantity of light until the stable lighting from the lighting start rises smoothly and comparatively early.

In accordance with a still further embodiment of the present invention, there is provided the high-pressure metal-vapor discharge lamp lighting apparatus in which additionally the control circuit maintains the lamp power at a maximum power for a predetermined time after the lighting start and successively reduces the lamp power in accordance with the predetermined reduction ratio characteristics so that the quantity of light at the starting time rises early.

In accordance with a still another embodiment of the present invention, there is provided a headlight device for a vehicle comprising: a headlight device main body for the vehicle, and the high-pressure metal-vapor discharge lamp lighting apparatus disposed in the headlight device main body for the vehicle according to any one of the embodiments of the present invention. Accordingly, the device has an advantage or advantages in accordance with any of the above-described embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A high-pressure metal-vapor discharge lamp lighting apparatus comprising:

a high-pressure metal-vapor discharge lamp;

a lighting circuit which urges the high-pressure metal-vapor discharge lamp; and a control circuit constituted to supply a lamp power larger than a rated lamp power from the lighting circuit and light the high-pressure metal-vapor discharge lamp and to subsequently control the lighting circuit in such a manner that the lamp power is successively reduced in accordance with predetermined reduction ratio characteristics to settle at the rated lamp power and to vary the reduction ratio characteristics in accordance with fluctuations of rising characteristics of a quantity of light in the high-pressure metal-vapor discharge lamp.

2. The high-pressure metal-vapor discharge lamp lighting apparatus according to claim 1, wherein the control circuit comprises a variable reduction ratio correction circuit which corrects the reduction ratio characteristics of the lamp power.

3. The high-pressure metal-vapor discharge lamp lighting apparatus according to claim 1, wherein the high-pressure metal-vapor discharge lamp contains a first halide comprising a halide of a luminescent metal and a second halide to form the lamp voltage, and does not essentially contain mercury.

4. The high-pressure metal-vapor discharge lamp lighting apparatus according to claim 3, wherein the maximum power is in a range of twice to three times a rated power of the high-pressure metal-vapor discharge lamp.

5. The high-pressure metal-vapor discharge lamp lighting apparatus according to claim 3, wherein the first halide contains at least one type of halide selected from the group consisting of sodium, scandium, indium, and rare earth metals including dysprosium.

6. The high-pressure metal-vapor discharge lamp lighting apparatus according to claim 5, further comprising a second halide containing one or a plurality of types of metals selected from the group consisting of magnesium, iron, cobalt, chromium, zinc, nickel, manganese, aluminum, antimony, beryllium, rhenium, gallium, titanium, zirconium, and hafnium.

7. The high-pressure metal-vapor discharge lamp lighting apparatus according to claim 1, wherein the control circuit maintains the lamp power at a maximum power for a predetermined time after lighting start, and subsequently successively reduces the lamp power in accordance with the predetermined reduction ratio characteristics.

8. The high-pressure metal-vapor discharge lamp lighting apparatus according to claim 6, wherein further a rare gas containing xenon for starting emission is charged.

9. The high-pressure metal-vapor discharge lamp lighting apparatus according to claim 1, wherein the control circuit includes a microcomputer.

10. The high-pressure metal-vapor discharge lamp lighting apparatus according to claim 9, wherein the microcomputer includes a memory table in which a lamp power corrected value associated with the lamp voltage change ratio is stored.

11. A high-pressure metal-vapor discharge lamp lighting apparatus comprising:

a high-pressure metal-vapor discharge lamp;

a lighting circuit which urges the high-pressure metal-vapor discharge lamp; and a control circuit including a lamp voltage detection circuit which detects a voltage corresponding to a lamp voltage of the high-pressure metal-vapor discharge lamp, and constituted to supply a lamp power larger than a rated lamp power from the lighting circuit and light the high-pressure metal-vapor discharge lamp and to subsequently control the lighting circuit in such a manner that the lamp power is successively reduced in accordance with predetermined reduction ratio characteristics to settle at the rated lamp power and to vary the reduction ratio characteristics in accordance with a change ratio of a detection output of the lamp voltage detection circuit.

12. The high-pressure metal-vapor discharge lamp lighting apparatus according to claim 11, wherein the control circuit comprises a variable reduction ratio correction circuit which corrects the reduction ratio characteristics of the lamp power.

13. The high-pressure metal-vapor discharge lamp lighting apparatus according to claim 11, wherein the control circuit includes a microcomputer.

14. A headlight device for a vehicle, comprising:

a headlight device main body for the vehicle; and the high-pressure metal-vapor discharge lamp lighting apparatus disposed in the headlight device main body for the vehicle according to any one of claims 1, 11, 9 and 13.

15. A high-pressure metal-vapor discharge lamp lighting apparatus comprising:

a high-pressure metal-vapor discharge lamp;

a lighting circuit which urges the high-pressure metal-vapor discharge lamp; and a microcomputer which executes a function of supplying a lamp power larger than a rated lamp power from the lighting circuit to light the high-pressure metal-vapor discharge lamp and subsequently controlling the lighting circuit in such a manner that the lamp power is successively reduced in accordance with predetermined reduction ratio characteristics to settle at the rated lamp power and varying the reduction ratio characteristics in accordance with fluctuations of rising characteristics of a quantity of light in the high-pressure metal-vapor discharge lamp.

16. A high-pressure metal-vapor discharge lamp lighting apparatus comprising:

a high-pressure metal-vapor discharge lamp;

a lighting circuit which urges the high-pressure metal-vapor discharge lamp;

a lamp voltage detection circuit which detects a voltage corresponding to a lamp voltage of the high-pressure metal-vapor discharge lamp; and a microcomputer which executes a function of supplying a lamp power larger than a rated lamp power from the lighting circuit to light the high-pressure metal-vapor discharge lamp and subsequently controlling the lighting circuit in such a manner that the lamp power is successively reduced in accordance with predetermined reduction ratio characteristics to settle at the rated lamp power and varying the reduction ratio characteristics in accordance with a change ratio of a detection output of the lamp voltage detection circuit.

17. The high-pressure metal-vapor discharge lamp lighting apparatus according to claim 16, wherein the microcomputer executes a variable reduction ratio correction function of correcting the reduction ratio characteristics of the lamp power.

18. A method of lighting a high-pressure metal-vapor discharge lamp, comprising:

supplying a lamp power larger than a rated lamp power to light the high-pressure metal-vapor discharge lamp;

detecting a lamp voltage of the high-pressure metal-vapor discharge lamp;

detecting a change ratio of the lamp voltage;

referring to the detected lamp voltage to successively reduce a lamp power to be supplied in accordance with predetermined reduction ratio characteristics; and varying the reduction ratio characteristics of the lamp power in accordance with the detected change ratio of the lamp voltage.

* * * * *